(12) United States Patent
Potenzone et al.

(10) Patent No.: US 7,363,372 B2
(45) Date of Patent: Apr. 22, 2008

(54) SYSTEM AND METHOD FOR MANAGING CONTENT DELIVERED TO A USER OVER A NETWORK

(75) Inventors: Casey S. Potenzone, New York, NY (US); Jason Schwegel, San Jose, CA (US); Damian Franken Manning, New York, NY (US)

(73) Assignee: MTVN Online Partners I LLC, New York, NY (US)

( * ) Notice: Subject to any disclaimer, the term of this patent is extended or adjusted under 35 U.S.C. 154(b) by 556 days.

(21) Appl. No.: 09/777,304

(22) Filed: Feb. 6, 2001

(65) Prior Publication Data

US 2002/0152278 A1 Oct. 17, 2002

(51) Int. Cl.
*G06F 15/16* (2006.01)
*G06F 15/173* (2006.01)

(52) U.S. Cl. .................. 709/225; 709/203; 709/223; 709/229; 709/231

(58) Field of Classification Search ............... 709/219, 709/225, 229, 231, 203, 223; 455/45; 705/26
See application file for complete search history.

(56) References Cited

U.S. PATENT DOCUMENTS

| | | | | |
|---|---|---|---|---|
| 5,819,160 | A * | 10/1998 | Foladare et al. | 455/45 |
| 6,248,946 | B1 * | 6/2001 | Dwek | 84/609 |
| 6,662,231 | B1 * | 12/2003 | Drosset et al. | 709/229 |
| 2001/0025259 | A1 * | 9/2001 | Rouchon | 705/26 |
| 2001/0044851 | A1 * | 11/2001 | Rothman et al. | 709/231 |
| 2001/0053944 | A1 * | 12/2001 | Marks et al. | 700/94 |
| 2002/0010759 | A1 * | 1/2002 | Hitson et al. | 709/219 |
| 2002/0120577 | A1 * | 8/2002 | Hans et al. | 709/225 |

FOREIGN PATENT DOCUMENTS

WO    WO 00/59227    10/2000

OTHER PUBLICATIONS

Krimm, "Imagine Radio Launches," available at the Web site www.munb.com (Mar. 1998).

(Continued)

*Primary Examiner*—Quang N. Nguyen
(74) *Attorney, Agent, or Firm*—Fitzpatrick, Cella, Harper & Scinto

(57) ABSTRACT

A system is provided for managing the delivery of content over a network, particularly songs or music over the Internet. A station and playlist module manages the content delivered by a number of stations over the network, the type of content that may be delivered by each of the stations being specified by a playlist for that station. Preferably, at least one station includes two or more playlists and only one of those playlists specifies the content that may be delivered by that station at any one time. A database that stores information describing the content or songs that stations can deliver may be searched by users who may also request new content when a particular song is not found. Also, preferably there are at least two categories of system users including a first user category having full access privileges and a second user category having less than full access privileges but having access privileges to create and edit at least one station playlist.

7 Claims, 13 Drawing Sheets

OTHER PUBLICATIONS

Krigel, "Imagine tries net radio," available at the Web site www.yahoo.cnet.com, (Mar. 9, 1998).

"Imagine Radio Debuts a New Generation of Customized Radio," Imagine Radio, available at the Web site www8.techmall.com, (Aug. 24, 1998).

"Over 5,000 Public Radio Stations Now Available at Imagine Radio—Equaling The Number of commercial FM Radio Stations Available in the United States," Imagine Radio, available at the Web site www8.techmall.com , (Nov. 23, 1998).

* cited by examiner

SYSTEM AND METHOD FOR MANAGING CONTENT DELIVERED TO A USER OVER A NETWORK

FIELD OF INVENTION

The present invention relates to the field of content or information delivery over a network such as the Internet. More particularly, the present invention relates to a system for managing, developing and categorizing such content, especially Internet radio content.

BACKGROUND OF THE INVENTION

The delivery of audio and/or video information over the Internet has experienced considerable growth in recent years, and this form of media is expected to spread even further in the future as bandwidth capabilities expand and the general public becomes more familiar with Internet technology. Internet broadcasting (also referred to as webcasting or netcasting) includes delivering live or delayed versions of sound or video programing by streaming that programming to connected users. Typically, either a unique content stream is unicast to each intended recipient or a common content stream is multicast to a set of intended recipients. At the listener/viewer's end, hearing or viewing Internet broadcasts requires a computer network Internet connection and an appropriate audio/video player application such as RealPlayer™ from Real Networks, Inc. or Windows Media Player™ from Microsoft Corp—although generally any suitable multimedia player application may be used. Indeed, due to the popularity of streaming media over the Internet, several Internet radio and Internet television World Wide Web ("Web") sites that simultaneously distribute content over a number of channels/stations have been proposed or developed.

For example, International Patent Application No. PCT/US00/07175 assigned to Eclectic Radio Co., Inc. and published as International Publication No. WO 00/59227 on Oct. 5, 2000 describes a system for Internet and Intranet broadcast channel creation and management. The system offers audio automation and webcast automation so that multiple webcast channels, or stations, can be created and managed, including Internet radio, Internet television, and scheduled Website publishing. The channels are run using a program schedule created by the webcaster, or by using the system to automatically determine a program schedule using criteria provided by the webcaster or listener. Statutory performance license compliance and reporting is automatically provided for along with automatic advertising insertion. Monitoring and alerting functionality is also provided.

In addition, Internet radio systems, such as the Radio-.Sonicnet Web site run by MTV Networks or the previously available Imagine Radio™ Web site launched in 1998 by Imagine Radio Inc., provide listeners with the ability to customize radio or audio programming over the Internet. These systems broadcast a number of site-programmed music stations and also permit listeners to create and customize their own radio stations. In the site-programmed stations, selections or songs are played according to quasi-random algorithms that may be further influenced by listeners' ratings during a currently-playing selection, since the ratings change the propensity of that song to be replayed in the future. Listeners wanting a more customized experience can register with the site and create their own personal station by individually selecting their favorite artists and rating those artists to influence how often that artist is heard. The personal preferences of a listener-created station may be viewed or changed by the creator, e.g., at the system's Web site or through an edit button on the listener's tuner. Personalized stations may also be made publicly available to other listeners. The web-based tuner used by listeners may include an interface for displaying information such as the artist name, song title, and album name. Links are also provided for additional information on artists or to purchase the corresponding recording. Advertising is also inserted both within the radio programming itself and in banner ads displayed on the tuner.

With the rapidly increasing popularity and growth of Internet content delivery systems, the amount of information, e.g., musical content in the case of Internet radio, and the number of stations that must be managed across one or more Web broadcast sites is vast. Consequently, there is a need for a comprehensive, effective, and efficient content management system that has the capability and flexibility to scale with the growth of the broadcast/distribution system and the release of new content as well as the ability to support a number of different management users. It would further be desirable if the content management system could more readily facilitate and ensure compliance with statutory or other licensing regimes, provide for a greater ability to keep station content current, and efficiently enable the generation of detailed reports on content-specific broadcast information.

SUMMARY OF THE INVENTION

The present invention provides a system for managing the delivery of information content over a network, particularly for delivering songs or music over the Internet. The system enables users to manage content more effectively and efficiently and has the flexibility to scale with the growth of distribution capabilities and the ability to support a number of different users having different management roles and responsibilities. The system allows users to create and manage stations with greater flexibility and variety in terns of the content, while still ensuring that content delivered by stations remains valid and compliant with licensing and other requirements at all times. Furthermore, by enabling the generation of comprehensive reports, users can identify areas of interest or concern in the programmed content being delivered by stations.

In one aspect of the present invention, the content delivery management system comprises a station and playlist module that manages the content delivered by a number of stations over the network, the type of content that may be delivered by each of the stations being specified by a playlist for that station. Preferably, at least one station includes two or more playlists and only of those playlists is active and can specify the content that may be delivered by that station at any one time. In a preferred embodiment, the content is audio-based, and each playlist includes a number of songs that may be delivered by the station associated with that playlist. A playlist validation module preferably verifies that a playlist contains at least one combination of songs that are in compliance with a set of licensing rules. In another embodiment, the content is multimedia-based, and each playlist includes a number of music videos that may be delivered by the station associated with that playlist. A promotions module may separately manage promotional content for inclusion in the playlists. Similarly, an advertisement module may separately manage advertising content for inclusion in the playlists.

In another aspect, the content delivery management system comprises a database for storing information describing the content able to be delivered by one or more stations over the network, and a request module for allowing a user of the system to request new content, not described by information stored in the database. Where the content is at least partly audio-based (e.g., audio-based or multimedia based), the information stored in the database describes songs that may be delivered, and the new content is generally a song not already described. The request module may further allow the user to track the status of a request for a new song or content, and a song described by a user's new content request may be automatically added to a playlist once ready. A user search module also preferably permits a user of the system to search the information stored in the database by a song name, artist name, or recording name.

In another aspect, the content delivery management system comprises a user module for managing the operational access granted to users of the system. The user module classifies users into at least two categories. In a first user category a user has full access privileges to the system, and in a second user category a user has less than full access privileges to the system. However, a user in the second user category is generally provided with access privileges to create and edit at least one playlist for a station. Preferably, the user module permits a user in the first user category to create a profile for a user in the second category but does not permit a user in the second user category to create a profile for a user in the first category. Also, when content is categorized into supergenre and genre categories, the user module preferably permits a user in the first user category, but does not permit a user in the second user category, to create a supergenre or a genre category. A user activity log module may be used to maintain a record of user management activities carried out by all users of the system.

In still another aspect of the present invention, the content delivery management system comprises a content categorization module that allows a user to assign song content, based on an artist of each song, into supergenre and genre categories. Each genre category is assigned to only one supergenre category, while each artist is assignable to any number of genres. Similarly, each station in the system is also assignable to any number of genres.

In yet another aspect, the content delivery management system comprises a reporting module that compiles data based on song content delivered by each of the one or more stations, including data relating to the popularity of specific content with listeners of the stations. With each song being associated with an artist and a recording, the reporting module may further compile data relating to the artists or recordings of the songs delivered by each of the one or more stations. Moreover, where song content is assigned, based on the artist of each song, into supergenre and genre categories, the reporting nodule may also compile data relating to the supergenres or genres of the songs delivered by each of the one or more stations.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which.

DETAILED DESCRIPTION OF PREFERRED EMBODIMENTS

System Overview

Figure 1:
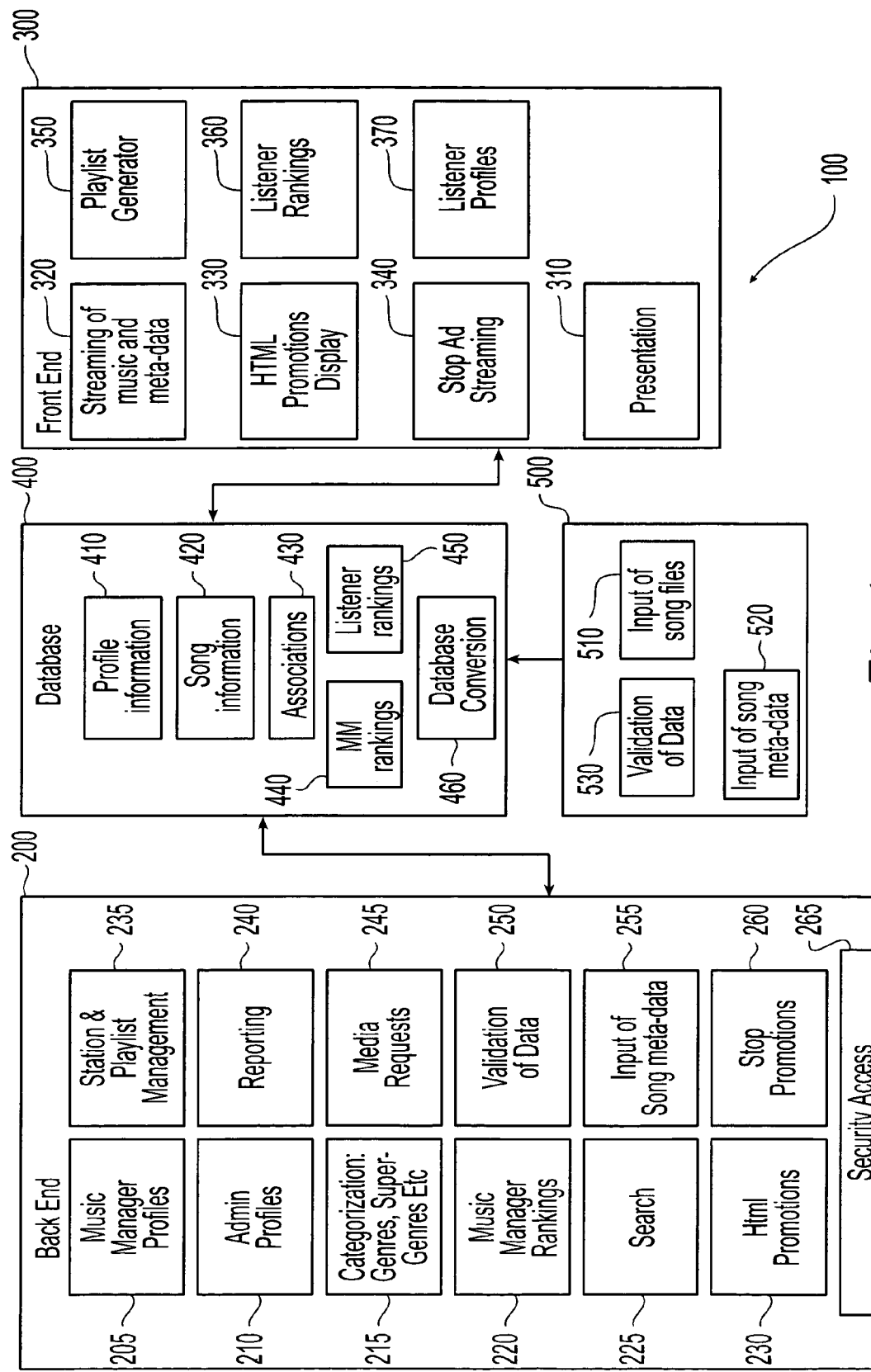
FIG. 1 is a block diagram operational overview of an Internet broadcasting content management system according to the present invention.

FIG. 1 shows a block diagram operational overview of a content delivery management system 100 in accordance with a preferred embodiment of the present invention. System 100 of the present invention is particularly suitable for, and the following description relates primarily to, the distribution or streaming of audio information, and more specifically of musical songs or tracks, over the Internet. However, it will be readily appreciated that the system and method of the present invention can also be used for other types of content, such as multimedia or video content. In particular, the present invention may relate to the distribution or streaming of multimedia-based music videos (or songs). In addition, the term "song" includes any audio-based or multimedia-based information of a musical nature whether or not it includes singing or instrumentals. Furthermore, content delivery management system 100 may also be used in connection with the distribution of content over other types of data networks, such as an Intranet. However, delivery over the Internet is described primarily below.

System 100 manages at least one and typically a plurality of independent stations or channels, with each station delivering a content stream to a user based on a playlist of songs, tracks, and promotional items for that station. A station may deliver a unique content stream to each listener (i.e., unicasting), so that different listeners of the same station may be listening to different content at one time. Alternatively, the same content stream may be multicast to all current listeners of a given station. System 100 is preferably implemented using the Dynamo™ e-Business Platform from Art Technology Group which facilitates the delivery of content over multiple channels or stations. At least some of the stations are "professionally managed" by users of content management system 100. As described below, content management system 100 is preferably accessible to at least two different classes of users: managers (or music managers) and system administrators (including both content and technical administrators). In a preferred embodiment, professional music managers generally are responsible for programming the content of specific stations and/or playlists of stations to which they are assigned (i.e., authorized to manage). In some cases, a music manager may instead be a celebrity, artist, or actor who programs a "Guest DJ" station. System 100 may also support listener-managed stations created by listeners who desire radio content that is more customized to their tastes. In this case, a listeners may also be considered a music managers who, in a more limited capacity, can access and manage the content of the listener's personalized station, but otherwise has no user privileges in system 100.

Referring now to FIG. 1, content management system 100 comprises four main components: a system back end 200, a system front end 300, a system database 400, and a data source application 500.

System back end 200 comprises a number of operational blocks for managing delivered content, and access thereto, in system 100. The operational blocks in back end 200 include a music manager profiles block 205, an administrator profiles block 210, a content categorization block 215, a music manager rankings block 220, a search block 225, an HTML promotions block 230, a station and playlist management block 235, a reporting block 240, a media requests block 245, a validation of data block 250, and input song metadata block 255, and a stop promotions block 260. Back end 200 preferably runs on a server in a private local area network or Intranet to which music manager and administrator users of system 100 are connected. In a preferred embodiment, users of system 100 can conveniently access system 100, including back end functions, via a Web browser application. Most of the content management tasks performed by system 100 take place in back end 200, as described in detail below.

System front end 300 generally runs on a Web server connected to the Internet (or other data distribution network) and thereby to listeners (or viewers in the case of video broadcast content) who receive the broadcast content. As shown in FIG. 1, front end 300 preferably includes the following operational blocks: a presentation block 310 which generally serves as the host broadcasting site and provides the external interface to which listeners connect; a streaming music and meta data engine block 320 which directs the trafficking of streaming broadcasts to listeners; an HTML promotions display block 330 which controls the display of promotions during broadcast streaming; a stop ad streaming 340 which controls the insertion of advertising into the content broadcasts; a playlist generator 350 which determines the order of broadcast content in accordance with prescribed system and licensing rules; a listener rankings block 360; and a listener profiles block 370 used for registered listeners who create their own stations. Streaming engine block 320 is preferably designed to only allow listeners to receive streaming content and to hinder listeners from capturing any of the streamed content.

System database 400 includes: a profile information block 410 containing data relating to the music manager, administrator, and registered listener profiles; a song information block 420 containing data relating to all songs playable by system 100 and links to the playable audio content files for those songs; an associations block 430 containing data relating to how songs, stations, and other data types are categorized and assigned/related to one another; a music manager rankings block 440 containing data relating to the song rankings entered by music managers; a listener rankings block 450 containing data relating to the song rankings entered by registered listeners; and a database conversion block 460 for receiving extracted song information from data source application 500 and converting it into an appropriate format for storing in song information block 420. The song information includes a link to the encoded audio content which is preferably stored elsewhere in one or more content databases (not shown) associated with system front end 300.

Data source application 500 is used to extract information from song files and then transfer the extracted data to system database 400, as described above. Data source application 500 includes an input of song content files block 510, an input of song metadata block 520, and a validation of data block 530.

System Function

A preferred embodiment of system 100 will now be described in terms of the following functional modules of the system and related operational blocks in FIG. 1.

Categorization (Supergenre/Gentre)

The term "supergenre" refers to a high-level music category that largely groups music according to type. Examples of supergenres are "Rock", "Pop", "Classical", and "R&B/Soul". A "genre" is the next-level music category that sub-categorizes music below a certain music supergenre. Examples of genres that may be found under the "Rock" supergenre are "Active Rock", "Classic Rock", and "Punk". Additional sub-genres may also be used. Generally, the supergenre list is relatively short and does not change frequently. On the other hand, the genre list, as a whole, may become long and be updated frequently. Each supergenre contains one or more genres below it, and a genre generally contains a number of artists and stations. System 100 allows administrators and preferably also music managers to manage supergenres and genres.

In a preferred embodiment, system 100 may allow users to perform the following functions in categorization block 215 with respect to supergenres:

1. Ability to list all supergenres.
2. Ability to view supergenre metadata.
   The metadata generally includes the name of the supergenre, a description, and a unique read-only ID that is assigned by system 100.
3. Ability to add a new supergenre.
   The user enters a name and description metadata, and an ID is assigned by the system. The supergenre name must be unique and preferably includes only alphanumeric characters. If a user enters a name that is not unique or contains improper characters, system 100 notifies the user to correct it.
4. Ability to edit a supergenre.
   A user may modify the name and description metadata of the supergenre, associate/dissociate a genre to/from the supergenre, and enable/disable genres associated with the supergenre.
5. Ability to delete a supergenre.
   When a user deletes a supergenre, all associated genres and all relevant genre mappings are also deleted. Therefore, optionally, system 100 may require the user to "empty" the supergenre of all associated genres by deleting those genres, before allowing the supergenre to be deleted.
6. Ability to associate stations to a supergenre.

Since it is generally expected that the list of supergenres will rarely change, it may not be necessary to implement some of the functional requirements above as separate tools/screens in system 100. Instead, a technical administrator can manually perform at least some of the above supergenre functions. Similarly, in a preferred embodiment, system 100 may provide the following functional requirements with respect to genres:

1. Ability to view genre metadata

The genre metadata includes the genre name and description and a system-generated unique ID.

2. Ability to add a new genre.

A user may enter the name and description metadata for the genre, and a unique ID is then assigned by system 100. Preferably, the genre name must also be unique and includes only alpha-numeric characters. If a user enters a genre name that is not unique or contains improper characters, system 100 notifies the user to correct it. The user also maps the genre to an existing supergenre. System 100 preferably ensures that a genre is associated with only one supergenre.

3. Ability to copy an existing genre to another.

The user preferably must modify the copied genre metadata (name and possibly also description), since the genre name must be unique, and then map the copied genre to a supergenre. Preferably, the new genre initially maintains the artist associations that existed for the copied genre.

4. Ability to move a genre between supergenres.

The user disassociates a genre from its current supergenre and associates the genre to another supergenre.

5. Ability to edit a genre.

The user may edit the genre's metadata (name and description), enable/disable the genre, and associate/dissociate one or more artist(s) to/from a genre. For this purpose, system 100 preferably permits multiple artists to be added or removed at the same time and also permits the user to view all artists that have no mapping to the current genre to facilitate the creation of new associations. Also, if an existing genre is not mapped to a supergenre, a user may map the genre to an appropriate supergenre.

6. Ability to delete a genre.

Categorization block 215 interfaces with presentation block 310 in system front end 300. Categorization block 215 also interfaces with station and playlist management block 235 by (i) sending station search criteria and requests to associate/disassociate a station to or from a genre and by (ii) receiving a list of station IDs and names as search results. Categorization block 215 additionally interfaces with song information block 420 to send artist search criteria and receive artist search results (names and IDs). Categorization block 215 also sends associations block 430 requests to associate/dissociate an artist to or from a genre.

System 100 preferably maintains a log of the following categorization activity: addition of a new supergenre; modification of a supergenre; editing of supergenre metadata; addition or removal of genre-to-supergenre associations; enabling/disabling of genres; deletion of a supergenre; addition of a new genre; copying of a genre to another; moving of a genre between supergenres; modification of a genre; editing of genre metadata; enabling/disabling of genres; addition or removal of artist-to-genre associations; and addition or removal of station-to-genre associations.

Stations/Playlists

Stations and playlists are, respectively, online radio stations and the list of songs (or other content) that can be chosen for play on that station. A playlist effectively specifies the nature of the content (e.g., the particular songs) that may be inserted into a content stream distributed by a station. The playlist does not directly map to a list of songs that is played or streamed by the system. Instead, playlist generator tool 350 determines when, in what order, and how often the songs in a playlist are played. This is determined by the rankings or weights given to songs in a playlist, and by content licensing compliance rules (such as the requirements of the Recording Industry Association of America (RIAA)) and other system rules that must be followed when creating an actual list of songs to be delivered or broadcast from a playlist. For example, such rules may specify: that a single playlist may not have more than four songs by the same artist; that a single playlist may not require the playing of more than three consecutive songs by the same artist; that a single playlist may not require the playing of more than two consecutive songs from the same recording or box-set; and that a single playlist must have at least a certain minimum number of songs or involve at least a certain minimum number of hours of content. System 100 preferably validates all playlists by verifying that there is at least one combination of the songs in a given playlist that satisfies all of these requirements.

Advantageously, a single station may have any number of playlists. Only one playlist per station may be designated as an active playlist and the remaining playlists for the station are designated as non-active playlists. The activation of playlists may be performed manually by a user while logged on to system 100, however, alternatively, a user may program playlists to be time activated. Preferably, a user may only activate a playlist that is valid, and users may not edit an active playlist. A user wishing to edit the current playlist may copy that playlist into a new playlist, edit it as desired, and then activate the edited playlist which automatically deactivates the previously active one. As a result of the ability to have multiple playlists, system 100 provides stations with greater flexibility and variety in terms of content and the ability to edit content, while still ensuring that stations broadcasts are valid and compliant at all times.

Preferably, only administrators can create stations, and each station name must be unique within system 100. Stations may either be inactive or active, but system 100 preferably ensures that only stations that have an active playlist can be made active. As indicated, in a preferred embodiment active playlists cannot be edited or removed from active stations. Non-active playlists can be edited or deleted by an administrator any other user associated with the playlist or station. Also, stations may be classified as Guest DJ, professional, or listener-managed as indicated above. Stations also preferably have associated promotion content. This content may be stored in the form of a single HTML string. The promotion string preferably requires a separate operational privilege for a user to be able to edit it.

Each playlist comprises a list of associated songs as well as associated playlist metadata. This metadata includes the playlist's name and a related description. Only users that have been assigned a required operational privilege are able to edit the playlist metadata. In any situation, where a user attempting to perform a certain task in system 100 does not have the required privileges, system 100 does not allow the operation and informs the user of the refusal, preferably by providing details. In this manner, the screens for editing Playlists and Stations will be the same for users and administrators although the appropriate permissions will be checked accordingly throughout.

A user (e.g., a music manager or a registered listener), associated with a playlist may view the playlist details and add songs to the playlist, provided the song has been properly encoded, i.e. is playable, in all required formats of the system. Blocks 250 and 530 may perform this playability validation on song recording data. The playlist detail page preferably also contains a link to the player application for each song on the playlist, so that a user can preview a recording of a song when viewing the playlist details. The addition of songs is preferably accomplished through a search or browse interface. Duplicate songs are generally not permitted in the same playlist. In addition, although stations are mapped to supergenres, the classification is generally informational, and the mapping does not constrain the songs that can be played on that station to the songs in the genres associated with that supergenre. Songs are added to the playlists with a ranking/weight defaulting to that of the artist and genre mapping. However, the user may change the weight when editing the playlist. The playlist generator tool 350 uses the weights to influence the list of songs that will actually be played on a station. Weights are preferably assigned on a scale of 1 through 5, where a song with a weight of 5 is played the most often and a song with a weight of 1 is played the least often.

In a preferred embodiment, all additions, deletions, and changes of stations and playlists are logged by system 100.

Artists and Songs

An artist may have a list of one or more recordings (i.e., albums encoded into electronic format), each of which in turn may have a list of songs or tracks. Songs may reference a recording with a recording ID and album number in addition to a track number. A list of artists that are associated with each genre is maintained in associations block 430 of system database 400. Artists are preferably related to genres by a mapping that includes a default weight for that artist. Any song by that artist that is added from that genre is given that default weight when added to a playlist. An artist may have one default weight in one genre and a different default weight in another genre. In addition, the weight of a song in a given playlist may be changed when a user edits that playlist.

The creation of new artists, songs and recordings, is generally accomplished by data source component 500 which then transfers the metadata information into system database 400. Duplicate artist names are not permitted in a preferred embodiment. System users are able to manage the metadata that is associated with songs and artists to fix any problems that arise during encoding by metadata input block 520 of data source component 500 (such as a mix-up of song titles, misspelled descriptions, or other various errors). For some recordings, e.g., classical recordings, data source component 500 may not be able to create any metadata, and in such cases users may create the necessary metadata information to accompany encoded content.

The editing of song and artist information is generally authorized by system 100 on an operational permissions level, i.e., non-administrator users that have the operational permission to edit song or artist metadata will be allowed to do so, while other non-administrator users will not (all administrators can edit this information). If a user without appropriate permission attempts to make such changes, the action is not allowed and the user is notified accordingly. Preferably, the operational privilege provided by system 100 to enable users to edit songs, artists and recordings is separate from the operational privilege provided to enable users to create new songs, artists, and recordings. The song edit page displayed to a user editing song metadata, may have a link to a media player application to allow the user to listen to the encoded song.

As indicated, system 100 preferably only allows songs to be added to playlists if they are playable in each encoding format specified by system 100. The playability of songs is verified by validation of data block 530 in data source application component 500. For example, system 100 may require that all songs be recorded in four different formats: a low bit rate RealPlayer™ compatible format, a high bit rate RealPlayer™ compatible format, low bit rate Windows Media Player™ compatible format, and a high bit rate Windows Media Player™ compatible format. In this case, a song that is properly encoded in all four of these formats, is playable in system 100. Links to the song content in each of these formats would be stored in system database 400 as part of the song information.

Stations are not limited to using songs that are in the same genre(s) or supergenre(s) as the station, and users are generally able to add any playable song in the system. If a user searches for a song but cannot find it in system database 400, i.e., it has not been encoded, the user may make a request through media requests block 245 to have that song encoded and entered into the database. Conveniently, the user may program system 100 to automatically insert a song which is on hold, i.e., a song that has been received by administrators but is not yet available, into a specific playlist as soon as the song has been encoded and published on system 100.

System 100 preferably maintains a log of all changes to artists, songs and recordings including the time stamp, user, and the type of change that was made. Reports may also be generated to allow a user to see on what stations and how many times a particular song or artist was played, as described in more detail below.

Promotions

The promotions module manages the promotional content for each station, including both HTML station promotions and stop content promotions. Each type of promotion is created and edited, preferably on a station-by-station basis, through the respective promotions blocks 230 and 260 in FIG. 1. Stop promotions could alternatively be managed on a global station basis. The display of HTML promotions is controlled by HTML promotions display block 330 in system front end 300. Similarly, stop ad audio (and/or video) content is broadcast to listeners (or viewers) using stop ad streaming block 340 and playlist generator 350 in system front end 300. Preferably, HTML station promotions may be edited by both music manager and administrator users while stop content promotions are only editable by an administrator (i.e. those having administrative access privileges).

For HTML station promotions, each station has a different description and announcement for the promotion. The promotion may consist of text and images. A user, typically a music manager, may specify certain text and images—such as artist names and information or other descriptive text—to be displayed next to the station name as presented to broadcast listeners, so that listeners are given notice of what to expect from that station. Links may also be provided to direct listeners to sites or pages where they can obtain additional information on artists, labels, or music news or where they can purchase the recording being listened to. To give a user greater flexibility in the content and presentation of the promotions, the promotion is preferably captured and stored in HTML format. In this manner, the user can specify any desired format and content for the station promotion. HTML promotions display block 330 has the ability to capture an HTML promotion for each station, preferably as free-form text input. In addition, HTML promotions block 230 provides the user with the ability to edit the HTML promotion for each station. It should be noted that the promotion only appears if the station is active (i.e., is in rotation), and preferably only an administrator can make a station active.

Stop content promotions comprise audio content that is placed into content streamed by a station by playlist generator 350. An administrator is able to specify exactly what stop content should be included in the playlist(s) of each station. The audio stop content may for example include introductions, sweepers (audio interstices), and drop content (e.g. a sound clip from an artist promoting a song or station). In a preferred embodiment, an administrator can conveniently specify the content of the stop promotion using lists of numbers representing the audio content and in which commas separate the numbers in the list. In one embodiment, each promotion number list has a maximum length of 200 characters, including numbers and commas, and an input field for each type of promotion is validated to ensure that the format of the text is valid, i.e., numbers separated by commas. Stop ad streaming block 340 and playlist generator 350 use this information to intersperse the promotional audio with the songs in the playlist. Stop ad streaming block 340 may also provide the ability to capture a list of numbers for introductions, a list of numbers for sweepers, and/or a list of numbers for drops for each station. Stop promotions block 260 provides the ability to edit a list of numbers for introductions, a list of numbers for sweepers, and/or a list of numbers for drops for each station.

Preferably, any edits to a promotion are logged by recording at least the following information: the user, action, and associated station.

Advertising

Similar to the promotions module described above, system 100 may also include an advertising module (not shown in FIG. 1) for editing and creating advertising content. Again, in a preferred embodiment, advertising content is created and edited on a station-by-station basis and may include HTML or audio (and/or video) information.

User Management

Access to certain functions in system 100 is by access rights, or operational permissions/privileges. As indicated above, there are at least two types of users of system 100: i) administrators and ii) music managers that do not have full administrative operational privileges. Administrators are generally responsible for maintaining and administering the system, while music managers are preferably responsible for building playlists and managing stations and genres.

Administrators preferably have full administration rights for the entire system and may change the operational privileges for music managers. Music managers can preferably view and edit content only for those stations and genres to which they are assigned. Music managers may also have operational permissions to modify metadata for stations, genres, artists, recordings, and songs.

Generally, music managers may be assigned varying degrees of operational permission, however that permission is generally inferior in at least one respect to full administrative privileges. In accordance with one possible embodiment, Table 1 indicates the operational permission of music managers for a number of tasks performed by users of system 100. Privileges for tasks listed as "optional" may be enabled or disabled on a per-user basis, by selectively assigning operational permissions. Privileges for tasks listed as "limited" are constrained compared to the corresponding privileges accorded to administrators performing the same task.

TABLE 1

| Action | Administrator | Music Manager |
|---|---|---|
| View admin home system interface | ✓ | |
| Add supergenre | ✓ | |
| Edit supergenre | ✓ | |
| Edit stations in supergenre | ✓ | |
| Add station | ✓ | |
| Edit station | ✓ | |
| Edit supergenres for station | ✓ | |
| Edit supergenre metadata | ✓ | |
| List users | ✓ | |
| Edit genre | ✓ | ✓ |
| Add playlist to station | ✓ | ✓ |
| Edit station's playlist | ✓ | ✓ |
| Edit song metadata | ✓ | optional |
| Edit recording metadata | ✓ | optional |
| Edit artist metadata | ✓ | optional |
| Edit genre metadata | ✓ | optional |
| Add user | ✓ | ✓ (limited) |
| Edit user | ✓ | ✓ (limited) |
| Generate report | ✓ | ✓ (limited) |
| Browse library | ✓ | ✓ |
| Edit promotions | ✓ | ✓ |
| Edit my profile | ✓ | ✓ |
| View media requests | ✓ | ✓ (limited) |
| Submit new media request | ✓ | ✓ (limited) |
| Edit media request | ✓ | ✓ (limited) |

As shown in Table 1, administrators generally have access to the full user management functionality of content management system 100.

In another aspect, a music manager may also create a user having equal or less operational privileges than the manager has, if the music manager has a create user privilege. If the music manager is removed, all users created by that music manager are also removed. Note that the permissions required to gain access to specific screens or tools in system 100 are preferably coded into the design of the site, and may not be edited by users.

Music manager profiles are managed by block 205 and administrator profiles are managed by block 210 in FIG. 1. Profile information is stored in block 410 of system database 400. A list of users can be viewed and filtered (or sorted) by one or a combination of first name, last name, and username. Preferably, deleting a user requires confirmation and the user's profile information is still maintained in the database, however the user is marked as deleted (or inactive) in terms of system access privileges for system 100. This may be advantageous, for example, since the user information may still be needed if referenced elsewhere in the system (e.g., where a media request lists the user that entered the request.). Also, preferably, when a user is deleted any stations or genres maintained by the user are unaffected.

New users are preferably created by entering at least the following information: first name, last name, username, initial password. The username must be unique in the system and, for example, from three to ten characters long (passwords may be from six to ten characters long). The user type must also be specified—e.g. either a music manager or an administrator—and it is preferred that the user type cannot be changed after the user has been created. Preferably, station and genre assignments for the user are not entered while creating new users but instead when editing the user's profile.

By clicking on a user in the list of users, an administrator (or in some cases a manager) can edit the user's information. A list of genres and stations that the user is assigned to may be displayed along with a list of operational permissions for the user. Links are provided to modify assigned genres, assigned stations, and operational permissions.

To facilitate editing the stations to which a user has access, a list of the currently accessible stations of the user is preferably displayed, each having a button/ink for removal. When adding a station, a filterable/sortable list of all stations may be displayed, and the administrator editing the user's profile can select desired stations to assign them to the user. In addition, a user can also be assigned to one or more specific playlists within a station (as opposed to all of the playlists for that station). The genres to which a user is assigned can be similarly changed by an editing administrator.

When editing the operational permissions of a user, the functionality is preferably similar to that when editing station or genre permissions. In a preferred embodiment, at least the following operational permissions are assignable to a music manager user: song modification, i.e., permission to create/modify song metadata; genre modification, i.e., permission to create/modify genre metadata; artist modification, i.e. permission to create/modify artist metadata; and supergenre modification, i.e, permission to create/modify supergenre metadata.

Preferably, the creation or deletion of users and the modification of user permissions are activity logged by recording the ID of the administrator (or other user) performing the task as well as the user being added, deleted, or modified.

Reporting

The reporting module of system 100 generates reports that chart the status of specific music programming types. Advantageously, the reports permit administrators to identify trouble areas in the music programming, including low rated stations, artists, and songs. Reports may be generated on the following music programming types: supergenres, genres, stations, artists, and songs. For each programming type, the report compiles data regarding the type's association and mapping with other types, usage by stations and users, and other statistics.

Certain reports may require the user to specify a time range. Reports that contain statistical information over a period of time generally require a start date and end date. For example, if a report contains the number of times a song has played on a station during a period of time, the period of time will to be captured from the user—a default time period, e.g. the last week, may be provided if desired. Reports that are commonly used may be saved by a user to that user's home page within system 100 for direct and ready access, and the user profile manager can control the editing of these features. Reports may also be designed with an exportable option for saving reports in a desired file format. As described below, user access and activity logs are preferably compiled by an activity logging application that is separate from system 100, although such reports may also be stored in system database 400.

For the supergenre music type, the reporting module is preferably able to list all supergenres and display a time range (e.g., begin and end date) and one or more popularity measures for specific supergenres.

For the genre music type, the reporting module is preferably able to list all genres, the artists in each genre, the number of artists for each genre, the number of times an artist was played in all genres, and any artists not currently mapped to a specific genre. Furthermore for specific genres, the report may include the following information: a time range for the report; the number of artists mapped to the genre; the name of artists mapped to the genre; the number of times an artist was played in the genres; the number of listeners (e.g., all listeners or only registered listeners having personalized stations) that are currently mapped to this genre; the name of the supergenre that the genre is mapped to; the names of stations that are mapped to the genre; any playlist validity violations for stations in the genre; one or more popularity measures for the genre; and a list all songs in the genre.

For the station music type, the reporting module is preferably able to list all stations, the number of artists in each station, and the number of songs across all stations. Furthermore for specific stations, the report may include the following information: the number of artists mapped to the station (preferably derived only from the songs in the active playlist in the station); the names of artists in the station (preferably derived only from the songs in the active playlist in the station); any playlist validity violations for the station; the number of playable songs in the station; the percentage of songs having each of the possible weights/rankings; and one or more popularity measures for the station.

For the artist music type, the reporting module is preferably able to list the names of all artists of songs in database 400. In addition, for specific artists, the report may include the following information: a listing of all recordings of the artist including the associated ID for the recording; the title of each recording as entered by data source application 500; the type of each recording; the industry label for each recording; the date the recording media, e.g., compact disc, was ordered; the date the recording media was delivered; the date the recording media was received; the date the recording media was encoded; the date the encoded recording was transmitted for publishing; the date the encoded recording was published to streaming servers or outside vendors; the date the published recording was verified as being playable (i.e., was validated in all system formats); a list of all stations that play songs of the artist; a time range for the report; the number of times the artist was played for each station; a list of all genres that the artist is mapped to; the names of all genres that the artist is mapped to; and one or more popularity measures.

For specific songs, the report may include the following information: a time range; a listing of all stations that have the song on a playlist; the number of times the song has been played across all stations; and a status for the song.

It will be appreciated that, for each music programming type, many possible popularity measures may be calculated by the reporting module based on listener rankings, music manager rankings, the number of listeners, and so on. Reports are potentially portable to a reporting department, and to other systems and/or entities for real time statistics. A description of the report and the user requesting the report may also be recorded in an activity log.

The reporting module of system 100 may be programmed by users to automatically generate various reports periodically, e.g., on a weekly or monthly basis. Furthermore, in one embodiment, system 100 may be programmed to automatically build playlists for stations based on reports, particularly popularity measures. For example, a playlist may be programmed to always include a certain number of the most popular songs, and songs would be added to and dropped from the playlist as their popularity changes over time (subject to the playlist remaining valid, which would preferably also be checked automatically, each time the playlist is modified).

In one embodiment, streaming engine 320 and the media player applications used by listeners may support allowing a listener to skip the song currently being played. This feature is preferably only available to a listener where system 100 unicasts (as opposed to multicasts) a dedicated content stream to each listener, so that the content stream being delivered to another listener of the station is not affected. In this embodiment, reports may track how long listeners actually listened to songs as a further measure of popularity. This information can then also be used in managing station content. For example, if a particular song is played often, but a large number of listeners skip the song without listening to a significant portion of the song, a user managing the station may decide to remove the song from a playlist or to assign the song a lower ranking/weight.

Media Request/Tracking

The media request/tracking module in system 100 (media request block 245 in FIG. 1) advantageously provides users with the ability to track requests for purchasing, receiving, encoding, and processing of media. For example, where a music manager is searching for a song by a particular artist, and finds that the recording has not been purchased, the manager may enter a request for new media to be purchased and recorded into the system. Preferably, all users may view pending requests for media and submit requests for new media, but only administrators are able to update the status of a request.

A user can view a list of current and past requests and filter/sort the requests by status, and possible request status classes include:

1. requested: the media was requested;
2. ordered: the media was actually ordered;
3. delivered: the media was delivered to system administrators;
4. received: the media has gone through the receiving process;
5. encoded: the tracks were encoded by the data source application;
6. transmitted: the encoded tracks have been submitted for publishing;
7. published: the tracks were published to streaming servers or outside vendors;
8. playable: the media has been verified as playable.

The list preferably can be sorted by clicking on a column header.

For each request, the page may display: artist, recording name, current status, the date the request was submitted, and the user who submitted the request. Administrators may have the option to delete a request from this screen. Administrators are provided with a link to edit the request status—e.g. the current request status may be displayed in a drop-down list that can be changed to select a new status. Other information about the request is also displayed, preferably including: date ordered, date delivered, date received, date encoded, date transmitted, date published, and date last verified as playable.

In a preferred embodiment, only users with an appropriate operational permission can enter a new media request. A request may be made by entering the artist name and recording name (with system 100 automatically capturing the date of submission and the identity of the user submitting the request). The system need not validate the request data, other than ensuring that the artist and recording name fields are not left blank. Optionally, the media request module may check for duplicate entries, or alternatively administrators may simply delete duplicate requests.

Preferably, when a request is submitted or its status is changed, the request or status change entry is logged to the activity log.

Search

Search functionality is used throughout system 100 and is generally managed by block 225 in FIG. 1. The following searches are preferably enabled by a search module within system 100: searching for songs by recording name, artist name or song name; and searching for artists by artist name. Searches may be used as part of a library browsing functionality that allows the user to search a song library, view associated artist or recording information, and make changes to the associated metadata.

When searching for songs by recording name, the search results are a list of recordings that match the criteria entered by the user. A button/link allows the user to navigate to song information for the recording. When searching for songs by artist name, the search results are a list of artists that match the criteria entered by the user, along with a list of the recordings by that artist. The user can navigate to song information by following links for the recording and/or artist. When searching for songs by song name, the search results are a list of songs that match the criteria entered by the user. Search results are preferably displayed in sets and in a user-friendly manner.

Preferably, the search module allows matches based on the partial entry or prefixes of appropriate names, e.g. searching for 'Mad' would find 'Madonna'. In addition, search querying may be based on "like" database queries to find search results, e.g., the search string will be suffixed with a wildcard characters and all spaces inside the search string will be converted to wildcard characters to improve the matching of results. For example, searching for "Cult Club" would become "Cult % Club %" thus finding "Culture Club". If desirable, more powerful search tools, such as those using fuzzy logic, may be provided.

In addition, if the user has the appropriate permissions, when displaying search results system 100 preferably also allows the editing of nietadata, by displaying the artists, songs and recordings as links which point to edit screens for the entity's corresponding metadata. Also, system 100 preferably allows the user to play the songs returned by a search, for example, by providing links to the audio song content so that the desired songs may be played by the user using a media player application.

System 100 preferably also allows the adding of search results to either a genre or playlist, as appropriate. If the search is performed by a user as part of an edit playlist or edit genre task (see the description of user tasks below), the user may mark certain matches, songs and/or artists, and add them to either the genre or playlist. When the user has finished making the additions, the user is returned to the edit playlist or edit genre page, as appropriate.

Security

Security in system 100 is preferably managed in two ways: a system entry password for each user; and operational permissions/privileges. Users are preferably required to use a username and password to log on to the system, and thereafter can only perform tasks or actions for which they have permission. Operational permissions were described in connection with the user management module. Login security is described below.

To access system 100, a user must enter a valid username and password. If either the username or password is incorrect, an error message is displayed. For added security, the error message is the same whether the username is incorrect or the password is incorrect. Once logged in, a user may change the users password (preferably, the password must be typed in once, and then typed in again to confirm, and there is no change unless both agree). In addition, an administrator may change any user's password in a similar manner. The user's actual password is preferably encrypted before being stored in the database. Encryption is one-way so that passwords may not be decrypted from the database entry. In this manner, an administrator may change a user's password, but not view the user's existing password.

Preferably, each login, logout, and password change is recorded in the user activity log.

Activity Logging

A logging facility module (not shown in FIG. 1) records user actions/activities in system 100. The logging module interfaces with other modules within system 100 and provides a log of activities to report against at a later date to enable system usage analysis. Activity reports can be used to track a single user or to study the overall usage of system 100.

For each action by a user, the following information may be logged: the system ID of the user performing the action; the date and time of the action (i.e. a time stamp); a system assigned ID for the type of activity performed (for instance, creating a genre might be assigned the activity ID "76"); and the ID of the target of the activity (for instance, if the activity were creating a genre this would be the ID of the genre created, or if the activity were creating a user this would be the ID of the new user). In addition, optional argument text may also be recorded in activity logs and could include names of users and programming types as well. The argument text is preferably a variable character field in the database, so that it does not consume significant memory if left blank.

In a preferred embodiment, at least the following activity types are logged by the activity logging module:
1. Login
2. Logout
3. Add supergenre
4. Edit supergenre
5. Edit genre
6. Edit stations in genre
7. Add station
8. Edit station
9. Edit genres for station
10. Add playlist to station
11. Edit station's playlist
12. Edit song metadata
13. Edit recording metadata
14. Edit artist metadata
15. Edit genre metadata
16. Edit supergenre metadata
17. Add user
18. Edit user
19. Edit promotions
20. Edit my profile
21. Submit new media request
22. Edit media request Error/Application Logging A logging facility (not shown in FIG. 1) to interface with other modules and log errors and application debugging information to text log files is also preferably used by system 100. There may be two kinds of logging: exception logging and informational logging.

Exceptions generally include unexpected or uncontemplated events such as program errors. High severity exceptions may be logged to an error log, while low severity exceptions may be logged to a warning log. Also, high-level function entry/exit information may be logged to a debug log, whereas low-level function state/progress information may be logged to an info log. Error/Application Logging may be enabled at a component level or at global level for both exception and informational logging.

Exception Handling

An Exception handling module (not shown in FIG. 1) interfacing with other system modules is also preferably used to handle three types of exception circumstances: user based (or business) exceptions; technical exceptions; and form validation exceptions.

User based (or business) exceptions are generally classified as low or high severity and have a text message. The severity of the exception determines how the exception is logged, as indicated above. These exception messages are user-centered, logged to the error log, and displayed to the user on a separate business exception page.

Technical exceptions are also generally classified as low or high severity and have a text message. Technical exception messages are developer-centered. Preferably, technical exceptions are not displayed to the user, but are dealt with behind the scenes. Technical exceptions are logged to the error log. If a technical exception reaches the user, it is displayed on the screen at whatever point it happened in the rendering of the screen data. This may be performed using a configurable HTML template.

Form exceptions are not logged to the error log. They are displayed to the user on the screen where the exception occurred. The user is then prompted to enter correct data.

Business Object Model

Figure 2A:
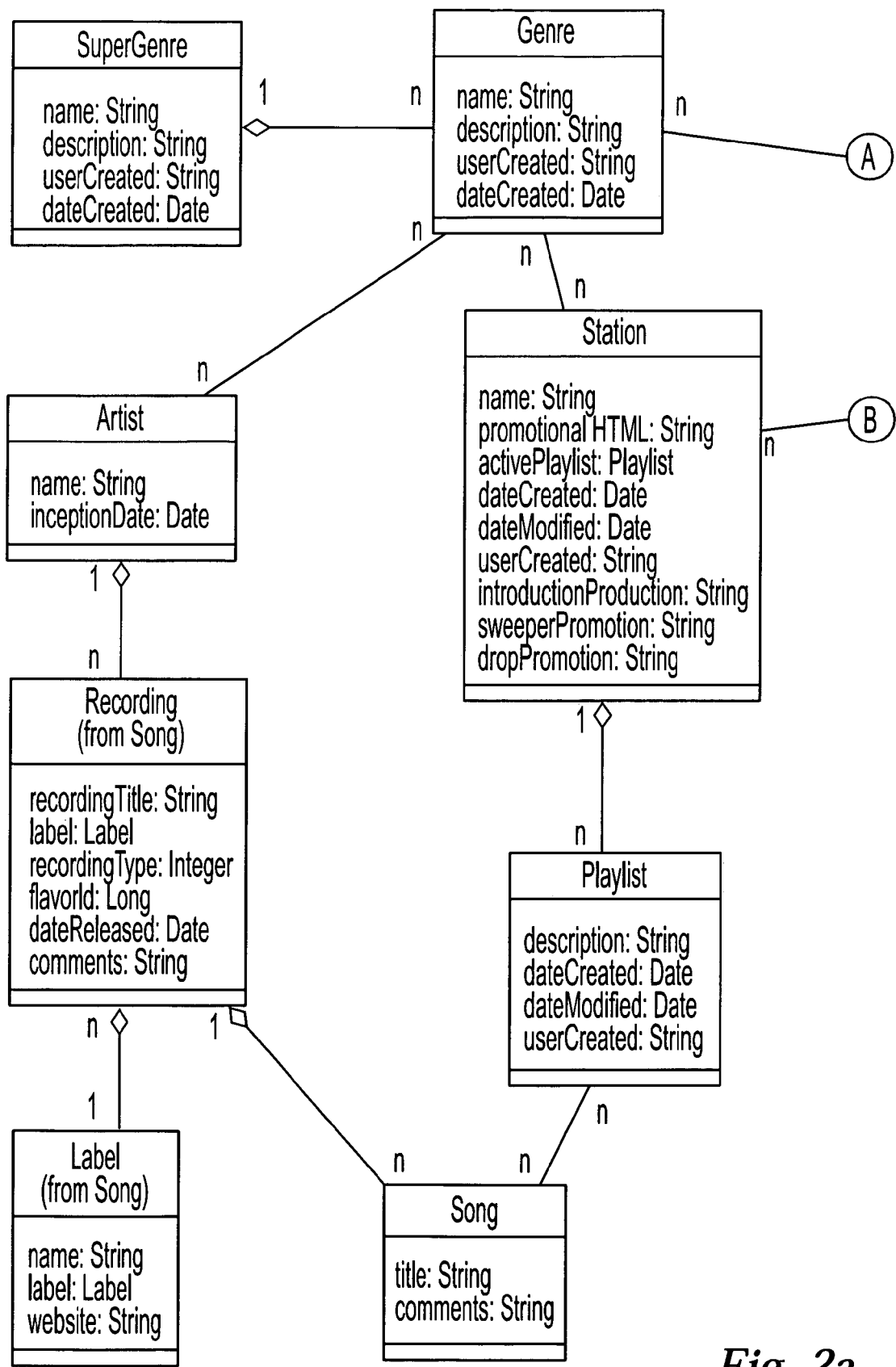
FIG. 2 is a business object model diagram for the technical design of the system of FIG. 1.
Figure 2B:
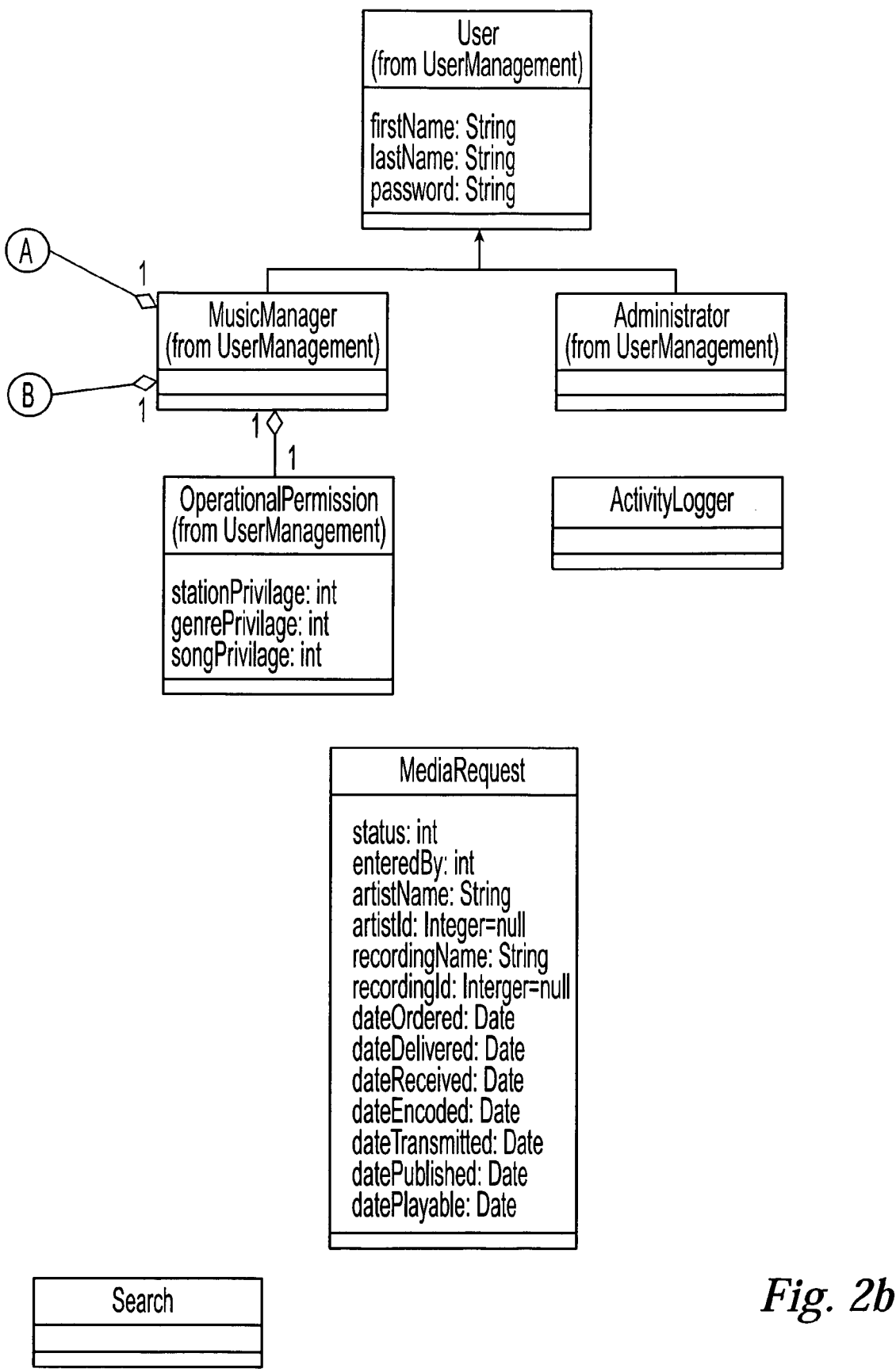

Referring now to FIG. 2, a business object model diagram suitable for use in the technical design of system 100 is shown. The model identifies a number of objects that directly represent business entities and functionality, and the model describes the attributes of, and the relationships between, those objects. In FIG. 2, objects for a supergenre, genre, artist, station, recording, playlist, label, song, user, music manager, administrator, operational permission, media request, search, and activity logger are illustrated. The model, its objects, and the objects' attributes will be readily understood given the functional description of system 100 provided above.

Figure 3:
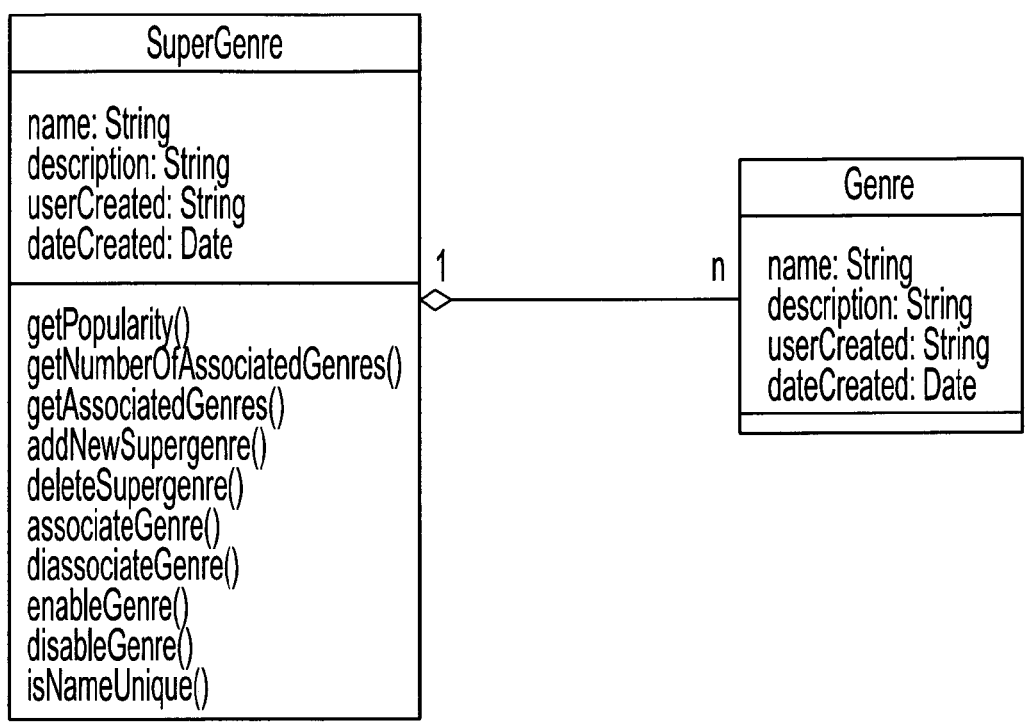
FIG. 3 illustrates a list of methods for the supergenre object in FIG. 2.
Figure 4:
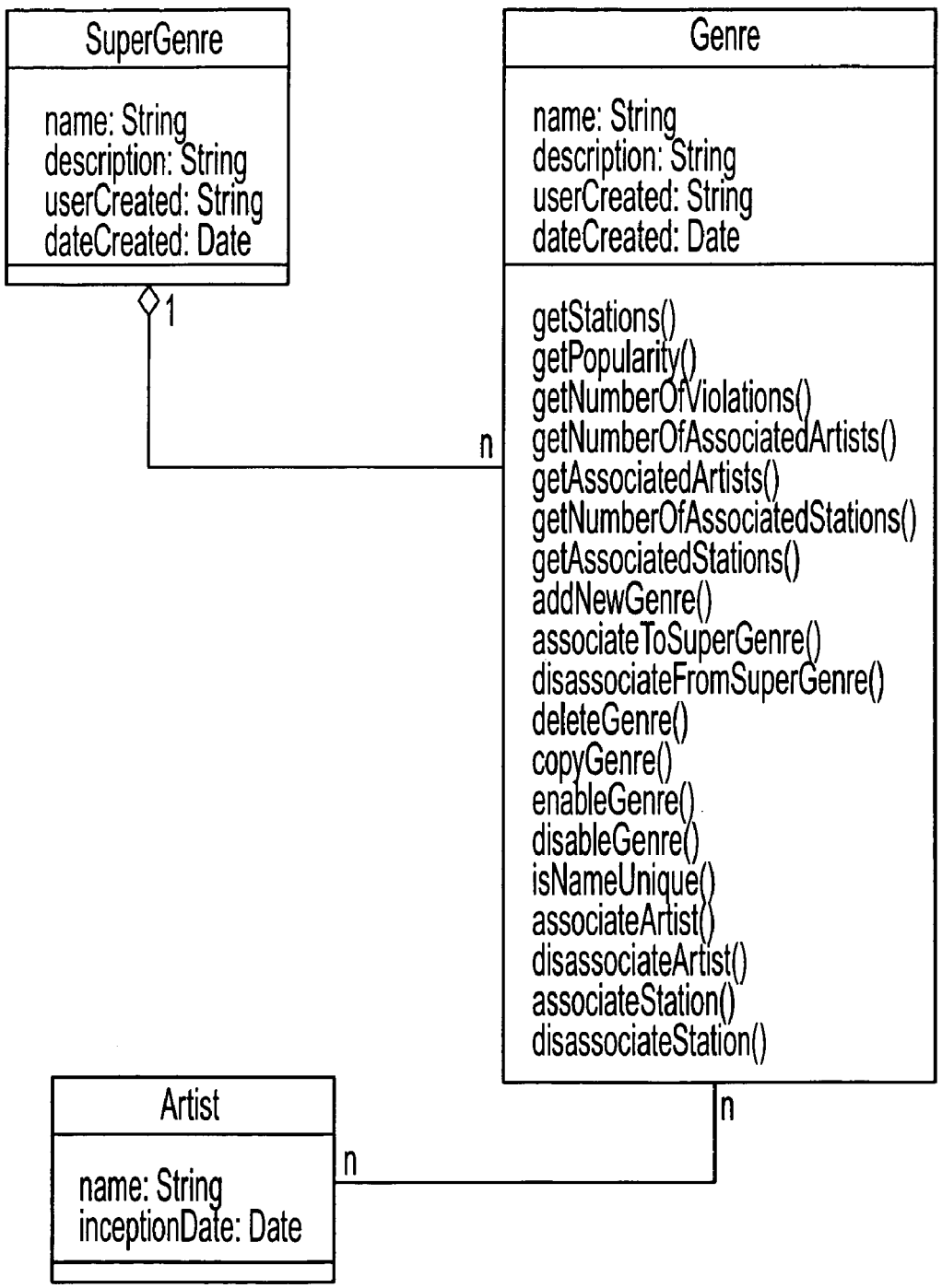
FIG. 4 illustrates a list of methods for the genre object in FIG. 2.
Figure 5:
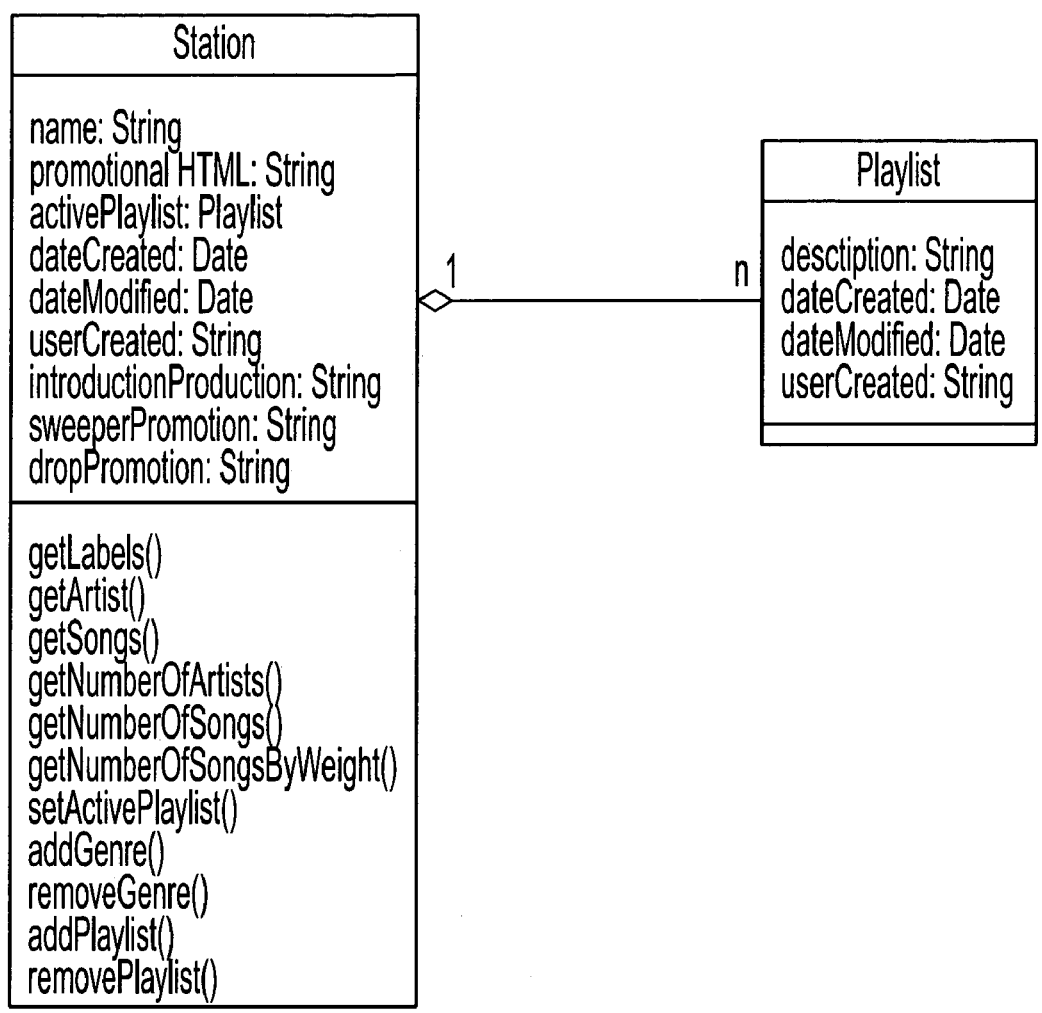
FIG. 5 illustrates a list of methods for the station object in FIG. 2.
Figure 6:
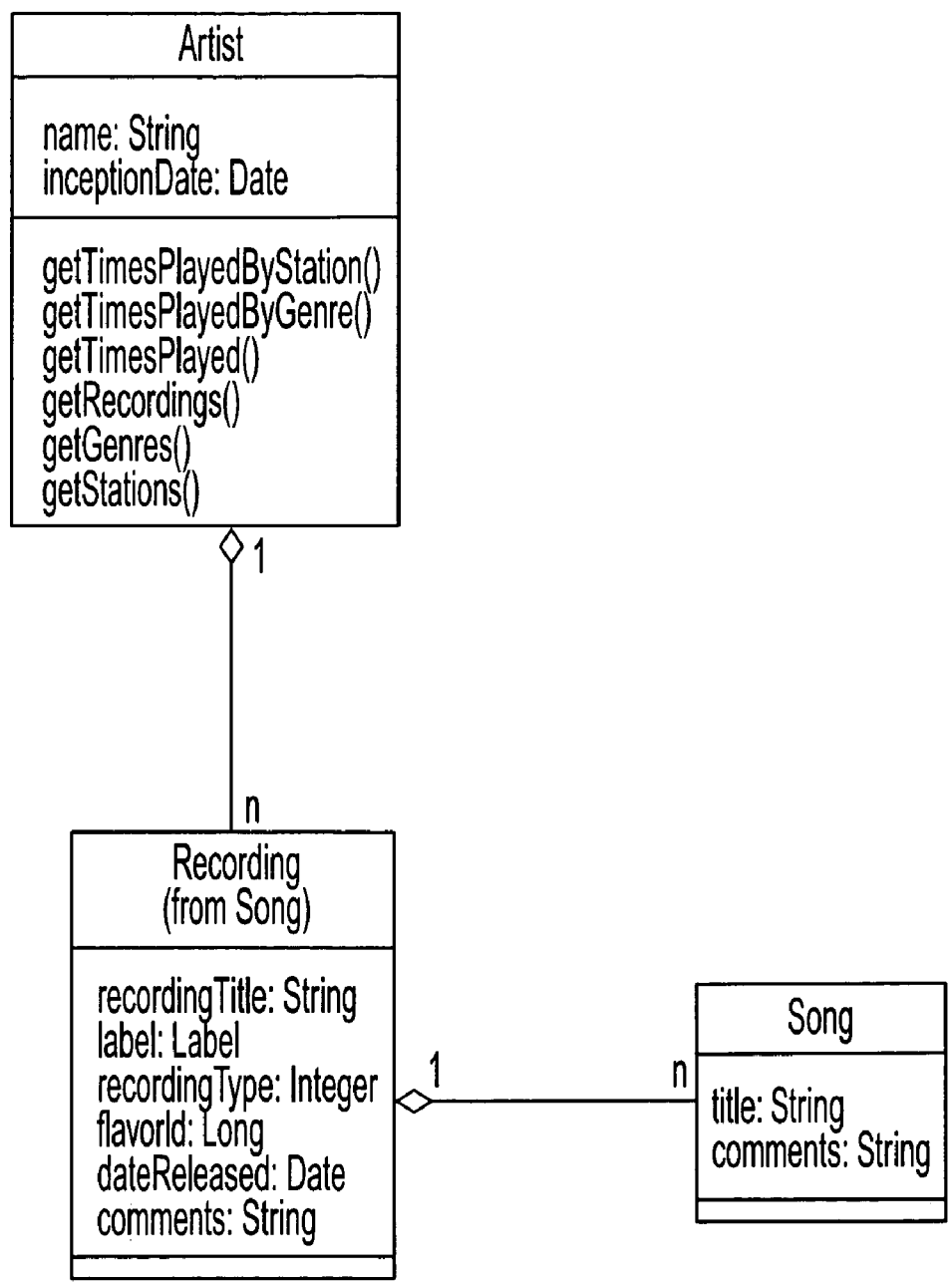
FIG. 6 illustrates a list of methods for the artist object in FIG. 2.
Figure 7:
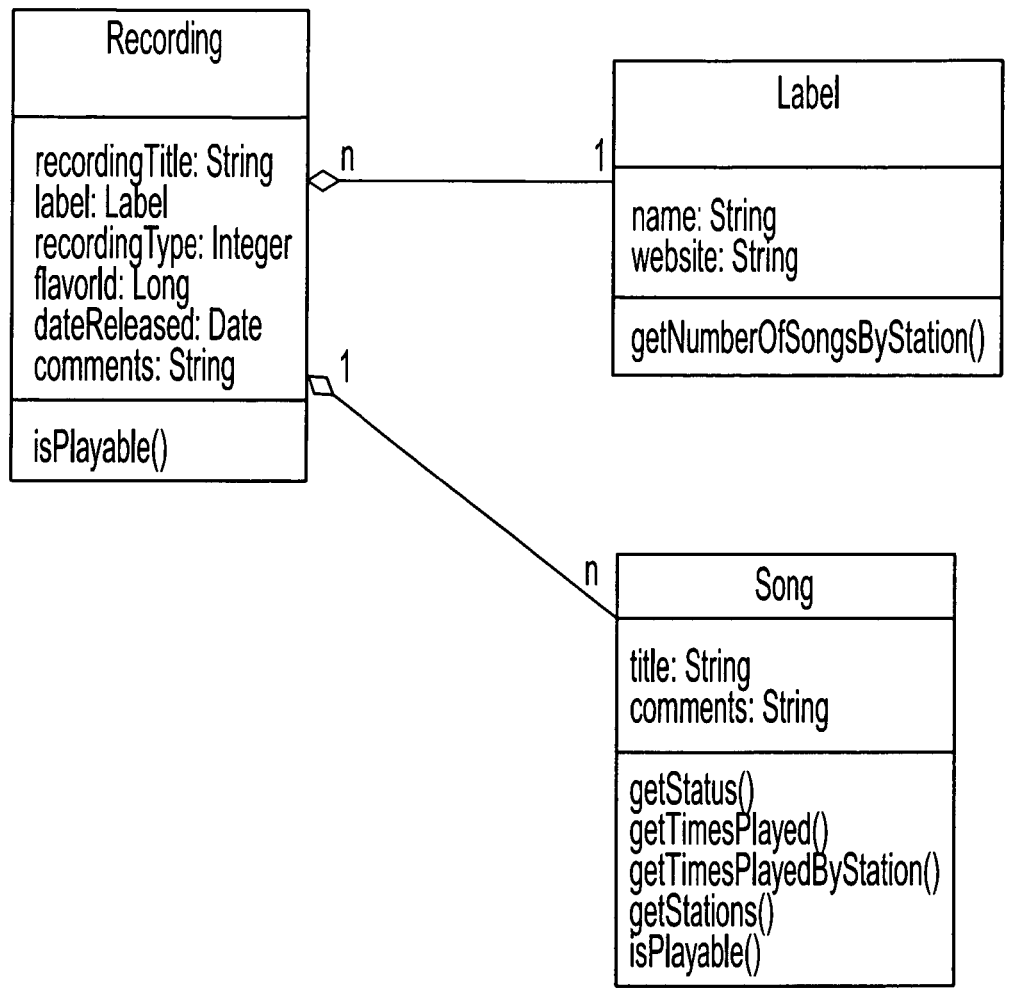
FIG. 7 illustrates a list of methods for the recording, label, and song objects in FIG. 2.
Figure 8:
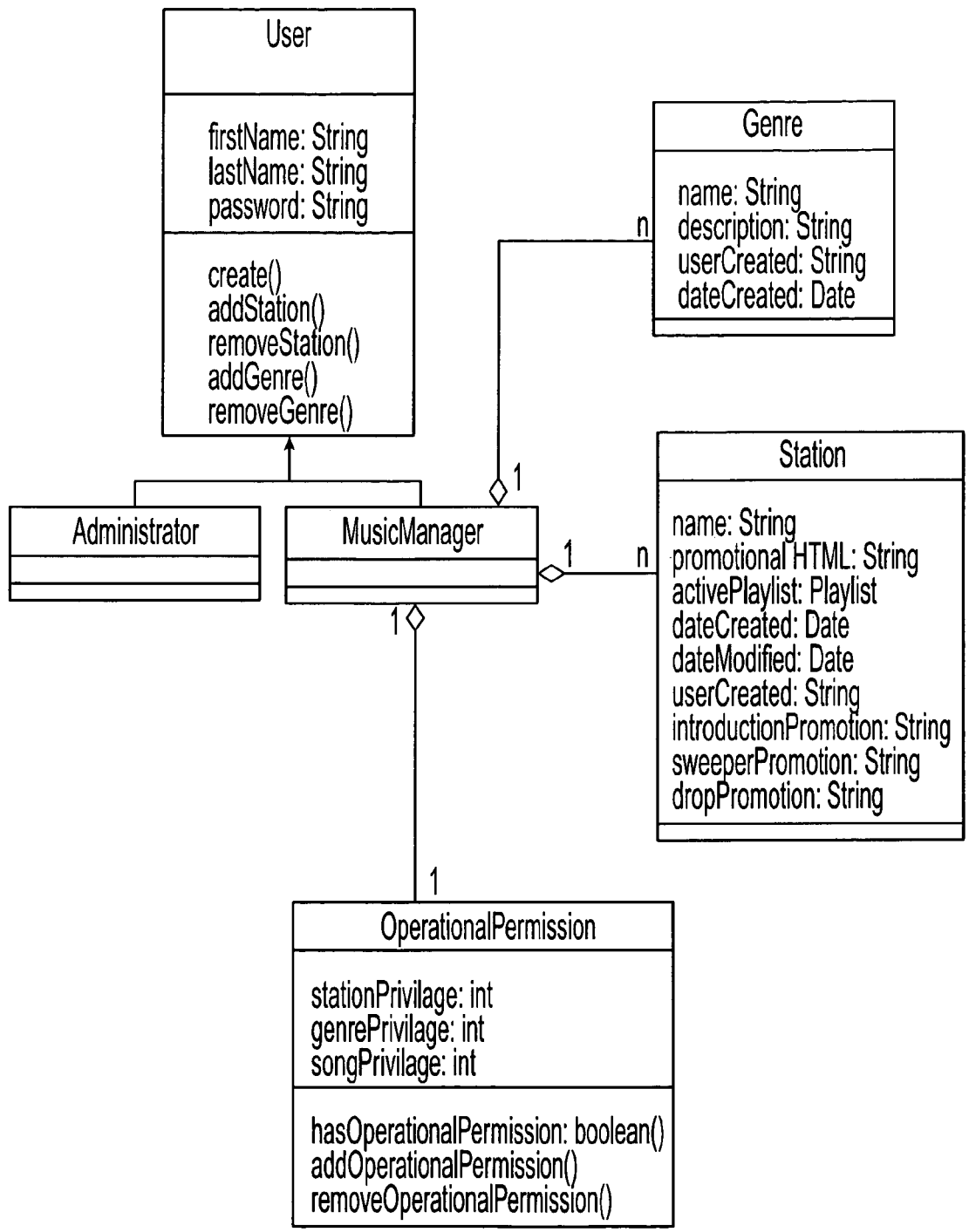
FIG. 8 illustrates a list of methods for the user management objects in FIG. 2.
Figure 9:
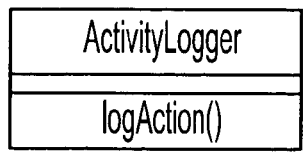
FIG. 9 illustrates a list of methods for the activity logger object in FIG. 2.
Figure 10:
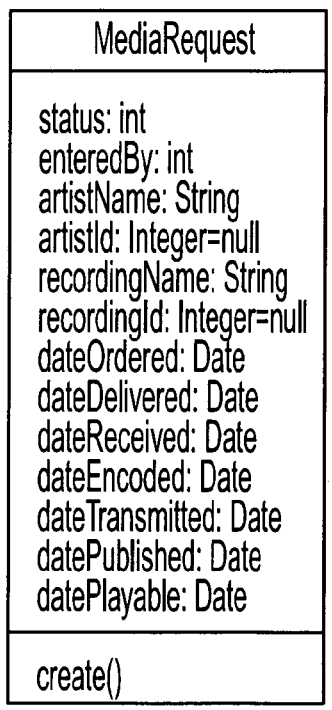
FIG. 10 illustrates a list of methods for the media request object in FIG. 2.
Figure 11:
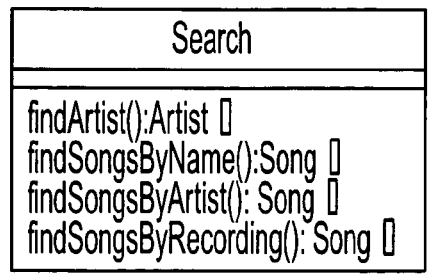
FIG. 11 illustrates a list of methods for the search object in FIG. 2.

In addition, a list of methods that each business object provides, in a preferred embodiment, is shown in FIGS. 3-11. In particular, FIG. 3 shows the list of methods for the supergenre object, FIG. 4 shows the list of methods for the genre object, FIG. 5 shows the list of methods for the station object, FIG. 6 shows the list of methods for the artist object, FIG. 7 shows the list of methods for the recording, label, and song objects, FIG. 8 shows the list of methods for the user management objects (user and operational permission), FIG. 9 shows the list of methods for the activity logger object, FIG. 10 shows the list of methods for the media request object, and FIG. 11 shows the list of methods for the search object. Again, the objects and their methods will be readily understood with reference to the description provided above with respect to the functionality of system 100.

User Tasks

A description of management tasks that users of content delivery management system 100 typically perform, in accordance with a preferred embodiment of the present invention, is provided below. It should be noted that to perform all tasks, the user must first be logged into system 100, as described above.

Create a New Playlist

This task may be carried out by a music manager or an administrator to create new playlists for the station or stations managed by that user. This task may be triggered by the user selecting an "add a new playlist" option. To perform this task, the user must have access rights for the particular station. At the conclusion of this task, a new playlist is added to the station in that system. In a preferred embodiment, the steps in this task are as follows:

1. The user selects an add a new playlist option. System 100 verifies whether the user has the necessary privileges, and if not the user is advised accordingly.
2. If the user has the necessary privileges, the user enters meta-data for the new playlist including a playlist name. System 100 verifies that the playlist name does not already exist in the station.
3. The user chooses songs they want to include in the user's playlist using the related tasks of adding songs to a playlist and, if necessary, modifying songs in a playlist (see below).

Add Songs to a Playlist

This task may also be carried out by a music manager or administrator to add songs to an existing playlist. This task is triggered when a user chooses to add a song to a playlist after having chosen either to modify songs in an existing playlist or to create a new playlist, and the user has permission to do so. At the conclusion of the task, after the user has added one or more songs, the playlist is saved with the newly added song(s). In a preferred embodiment, the steps in this task are as follows:

1. The user runs a search or browses for a song by desired criteria such as artist, recording title, song title, or a genre list of artists. To do so, the user enters the text to search for, or chooses a browse by option (see below).
2. The user chooses a song or a group of songs to add from the search results or a drill-down of the search results.
3. If system 100 confirms that the user has permission to do so, the song(s) are added to the playlist.

Modify Songs in a Playlist

A user, which again may be either a music manager or administrator, may edit a playlist that the user has permission to edit by selecting an option to modify songs in a playlist. The steps in this task in a preferred embodiment are:

1. A user selects an option to edit a playlist. System 100 checks whether the user has the necessary privileges, and if not the user is advised accordingly. System 100 also verifies that the playlist is not active, since preferably an active playlist cannot be modified.
2. The list of songs in the playlist are displayed to the user.
3. To delete a list of songs in the playlist, the user selects the desired songs and chooses a delete option. The updated list of songs are displayed to the user.
4. To change the weights (rankings) of the songs in the playlist, the user selects the desired songs, enters new weights in the weight fields, and then chooses an update option. The updated list of songs with the new weights are displayed to the user.
5. The user may also choose to sort the playlist by weight, by selecting a sort option. System 100 then displays the playlist sorted by weight. Alternatively, other sorting criteria can also be used such as title, artist name, date of release, or genre.

Note that a user may add songs to the playlist by performing the add songs to playlist task described above. In addition, a user may check the validity of an edited playlist, by performing a check playlist task as described below.

Request a Recording to be added to System

In this task, a user submits a request to add (e.g., purchase) a specific recording to system 100. The user must have permission to create a recording request. Requests are then entered into a song or media tracking system. In a preferred embodiment, the steps in this task are as follows:

1. The user selects a request new recording option. System 100 then verifies that the user has request permission or authority.
2. In a preferred embodiment, the user is first asked to search the media or song database, for example by using query or browse commands, to confirm that the desired song is not already in system 100. Alternatively, the system may automatically search the database to confirm that a requested song is not already present.
3. The user enters the artist name and recording description, and then submits the request.
4. If the user has entered information incorrectly, for instance the artist name or recording description field is blank, the user is asked to re-enter information. Otherwise, system 100 displays a success message for the request.

Modify Station Meta-Data

A user may modify a station's metadata by selecting this option. To perform this task, a music manager must have permission to modify the meta-data of the particular station. At the conclusion of this task, station metadata changes are saved in the system. In a preferred embodiment, the steps in this task are as follows:

1. A user selects a station to edit, and system 100 confirms that the user has permission to do so.
2. The user may then choose to modify a promotion field for that station. Preferably, system 100 may require an additional operational permission level to modify promotion fields, and, if so, system 100 further verifies that the user has permission to edit the promotion content. The modification process is described in connection with the manage stop promotions task below. Once modified, the system then shows the updated promotion for the station.
3. The user may choose to delete a playlist for the station. Preferably, system 100 does not permit the active playlist on an active station to be deleted, and so system 100 verifies that the playlist being deleted is not active. After a playlist has been deleted, an updated list of playlists is displayed.
4. The user may also choose to add a playlist for the station, and if so the steps in the add songs to playlist task, see above, are followed.
5. Similarly, the user may choose to edit an existing playlist by following the steps in the modify songs in playlist task described above.
6. As a further modification alternative, the user may choose to activate a specific playlist. If so, system 100 preferably verifies that the user has the operational privilege to activate a playlist and also that the playlist being activated is a valid playlist.

Search for Songs by Song Name

This task describes the process by which a logged-in user may search for songs in the song database by entering at least part of a song name. The user may be in the process of performing another task, such as adding a song to a playlist, when triggering this task. Thus, once the search is complete, the user is preferably returned to the screen or page from which the user triggered the search task. In a preferred embodiment, the steps in this task are as follows:

1. A user selects a search by song name option.
2. In a specified field, the user enters the song name or a part of the song name and then instructs the system to search for a corresponding name.
3. System 100 then returns and displays a list of songs. Preferably, each returned song is presented together with associated recording and artist information. For example, separate links for each type of associated information may be provided next to the song name. In addition, other details associated with the songs, such as a date of release, may also be displayed to the user.
4. The user may then navigate through the returned list of songs and/or the associated information details for those songs.

Manage Stop Promotions by Station

Users may create and modify promotions for a station, such as advertisements played between songs, by carrying out a manage stop promotions by station task. Using this task, a music manager or administrator editing a station's meta data is able to modify the introductions, sweepers, and/or drops for promotions. In a preferred embodiment, the steps in this task are as follows:
1. A user modifying a station's meta data chooses a manage stop promotions option, and system 100 verifies that the particular user has permission to perform this task.
2. To edit the introduction stop promotions, the user enters or modifies the list of introduction stop promotion IDs in a free-form text input list.
3. To edit the sweeper stop promotions, the user enters or modifies the list of sweeper stop promotion IDs in the free-form text input list.
4. To edit the drop stop promotions, the user enters or modifies the list of drop stop promotion IDs in the free-form text input list.
5. After the user has completed the modifications, the user is presented with a notice that the changes made to the stop promotions do not immediately take effect when they are saved.
6. The user then saves the changes.

Where the stop promotions are managed in a flat text file, as described above, they are preferably managed in system database 400 and exported to the flat text file using a batch process. This step helps ensure that the promotion data does not become out of sync when edited on a station-by-station basis.

Fix Station/Playlist

The fix station task is carried out by a user, preferably only an administrator having administrative operational privileges, to fix an invalid playlist of a station, such as a playlist that violates performance licensing compliance. In a preferred embodiment, the steps in this task are as follows:
1. An administrator chooses a station having at least one invalid playlist.
2. The user then selects an invalid playlist from a list of playlists for the station.
3. System 100 displays the playlist with its list of songs and a description of the validation rule(s) being broken.
4. The user modifies the playlist using the modify playlist task (see above) to fix the problem
5. After editing the playlist, the user may check the validity of the playlist by selecting a validate option (or alternatively system 100 may automatically determine if the edited playlist is valid after the user has saved the edited playlist). If system 100 determines that the modified playlist is still invalid, the user is notified.

Check Playlists

This task is triggered when an administrator having administrative privileges selects an option to check the validity of all playlists in system 100. In a preferred embodiment, the steps in this task are as follows:
1. From a report screen, the administrator selects an option to have all invalid playlists in system 100 displayed. System 100 confirms that the user has the administrative privileges to do so.
2. The user may then fix an invalid playlist in the displayed list by, for example, clicking on an edit button next to the playlist and carrying out the steps in the fix station/playlist task described above. As described above, the user is alerted if the edited playlist remains invalid.
3. Optionally, the user may then choose to make the newly validated playlist active. Preferably, only valid playlists may be activated.

Produce Report of Songs

This task is carried out by a user, optionally only by those having administrative operational privileges, to produce and view a report about a particular song. The task may be triggered by a user who chooses to search for a song to run a report on it while managing music entities, such as songs, artists, and/or recordings. At the conclusion of this task, a song report is generated. In a preferred embodiment, the steps in this task are as follows:
1. The user searches for the song by carrying out one of the possible search tasks.
2. Once the desired song is found, the user selects the song to run a report on thereon.
3. The user specifies the relevant time period for the report by entering start and end dates.

Default start and end dates may be provided, e.g., a start date of one week ago and an end date of the current date, and the user can simply overwrite these if desired. If the time period is invalid, the user is notified accordingly.
4. The user then selects a run option to generate the report.
5. Just prior to the report being run, the user is preferably notified that it will be necessary to manually return to the report generation page/screen (e.g. by clicking a "back" button on a browser) to be able to continue navigating through the system site as before.
6. System 100 displays the report to the user, preferably in a printer-friendly HTML format.
7. The user may then choose to print the report, e.g. from the user's browser menu.
8. The user may then return to the report generation page to continue navigating through the site.

It should be noted that, although a user will typically run a search for a song or songs prior to generating a report thereon, it is alternatively possible for a user to initiate report generation without first performing a search. For example, a user may be provided with a report generation option while viewing the song contents of a playlist. Furthermore, system 100 may also be adapted to permit a user to compile a report on more than one song simultaneously, e.g. on all songs on a specific playlist (see also the produce report of artists task below).

Search for Songs by Recording Name

A user may also searches for songs in the system database by entering at least part of a recording name. This task, preferably, can be triggered by a music manager or administrator who wishes to find a song by recording name. Since the user may be in the process of performing another task, such as adding a song to the playlist, when triggering this task, once the search is complete, the user is preferably returned to the user's previous screen or page. In a preferred embodiment, the steps in this task are as follows:

1. A user selects an option to search for a song by a recording name.
2. The user enters at least part of the recording name and executes a search command.
3. A list of recordings, together with associated artist information is presented. Preferably, a separate link is provided for the artist information (and any other presented information) next to or near a link for the recording name.
4. The user then chooses a recording from the list, and is presented with details about the recording, including a list of songs contained on the recording.
5. Subsequently, the user may farther select a song from the recording's list and be presented with details about that song.

Produce Report of Artists

A user (optionally only an administrator) may also generate and view a report about a particular artist using a produce report of artist task. Three types of reports may be generated for an artist—recordings, stations, and genres. Each report preferably appears in a separate printable report from the others. This task is typically triggered when, while managing music entities (such as songs, artists, and recordings), the administrator chooses to search for an artist and run a report on that artist. In a preferred embodiment, the steps in this task are as follows:

1. A user searches for the artist, e.g. by carrying out one of the search tasks.
2. The user finds the desired artist from the search results, and executes a run report command for that artist.
3. The user specifies the type of report they want to generate (recording, station, or genre) and the relevant time period for the report by entering in begin and end dates (again, suitable default dates may be provided for convenience). System 100 also confirms that the time period specified by the user is valid. The user may then confirm the instruction to run the report.
4. System 100 generates the report and displays it to the user, preferably in a printer-friendly HTML format.
5. The user may print the report out, e.g. from a browser menu. The user may then return to the report generation page, e.g., by executing a back command on the browser menu, and resume navigating through the system 100 site.

Again, it is alternatively possible for a user to initiate the generation of an artist report without first performing a search, and system 100 may also be adapted to permit a user to compile a report on more than one artist simultaneously, e.g. on all artists whose songs are on a specific playlist.

Search for Songs by Artist Name

Similar to the searching by song and by recording name tasks, a user may also search for songs in the system database by entering at least part of an artist's name. The user preferably may be a music manager or an administrator. Again, when the user has finished this search task, the user is preferably returned back to the page from which the user initiated the search. In a preferred embodiment, the steps in this task are as follows:

1. A user selects an option to search by artist name.
2. The user then enters at least part of an artist's name in a designated field and executes a search command.
3. A list of artists, together with associated recordings for that artist is presented to the user. Preferably, a separate link is provided for each recording (and preferably also for any other presented information) next to or near a link for the corresponding artist's name.
4. The user then chooses a recording from the displayed list, and the user is presented with details about the recording, including a list of songs.
5. Subsequently, the user may select a song from the recording's list and be presented with details about that particular song.

If desired, in the search by artist's name task (as well as in other searching tasks), more advanced searching capability, e.g. using of fuzzy logic techniques or proximity or Boolean operators between search terms. In addition, if a particular artist has many different recordings, the displayed search results may, for example, only list a portion of the recordings and provide a separate link to a complete set of recordings for that artist.

Update of Song, Artist, and/or Recording Metadata

This task is used by an administrator (or optionally a music manager) to modify or edit song, artist, and/or recording metadata. When the user has finished, the appropriate metadata is updated. In one embodiment, the user preferably must have administrative privileges to perform this task, however this not necessary. In a preferred embodiment, the steps in this task are as follows:

1. A user searches for a song by a song name, artist name or recording name.
2. The search results are displayed to the user who chooses to view the details of a song, an artist, or a recording.
3. The details of the appropriate entity (or object) are displayed.
4. The user then selects an option to update that entity, and system 100 confirms that the user has permission to do so.
5. The permitted user updates the fields for the entity as desired, and then either confirms the changes or cancels the update.
6. Once the changes have been saved (or canceled), the user is taken back to the appropriate search details screen Check that a Song is Playable A check that song is playable task is performed by a user to verify that a song is playable from the distribution network of system 100. In a preferred embodiment, wherever a song name is presented, e.g., as a search result or as an entry in a playlist, a link to the audio content of the song (playable on a multimedia player application) is available to play the song in all available formats.

Assign Artist to Genres

An administrator wanting to assign a genre to an artist carries out this task. Preferably, the genre(s) to be assigned to an artist is specified by documentation, such as reports, that is provided to the administrator before carrying out this task. In a preferred embodiment, the steps in this task are as follows:

1. A user searches by artist name and is presented with a list of artists as described above.
2. The user selects the artist from the list for whom a genre is to be assigned or modified, and an associated artist details screen is displayed. Typically, however, when performing this task no genres will yet be associated with the artist (since it is expected to be rare that an artist will change genres).
3. The user then selects an option to assign the artist to one or more genres, and system 100 confirms that the user has the necessary administrative privileges.
4. A list of genres is presented to the user, and the user denotes the genre or genres that are to be associated with the artist. (Note that, if required, a previously assigned genre can also be de-selected at this step.)
6. The user then confirms the genre assignment or, alternatively, cancels out of the task without making any changes.
7. The user is returned to the artists detail screen.

Update Status of Recording Request

This task is carried out by an administrator to update the status of a recording request. The task is triggered when an administrative user chooses to edit a recording request, e.g. after a recording has been published on to system 100 or after it has been determined that a recording will not be encoded in system 100. At the conclusion of this task, the status of the request is changed in the song or media tracking system. In a preferred embodiment, the steps in this task are as follows:
1. A user selects an option to view existing recording requests, and system 100 confirms that the user has the necessary privileges to do so.
2. System 100 displays the current list of recording requests and their status.
3. If desired, the user may filter the list of current recording requests by status or sort the requests by field.
4. The user then selects an option to edit a particular recording request.
5. The user then updates the request by changing its status as appropriate and submits the updated request
6. System 100 updates the request status, including date information for key status changes (e.g. the date of encoding).
7. System 100 then redisplays the request status screen, with the updated status information.

Produce Report of Genres and Supergenres

This task is carried out by an administrator (and preferably not a music manager) to generate and view a report for a genre or all supergenres. Preferably, the user can only generate a report for a specific genre, and must therefore select the genre for which a report is to be run. Also, preferably, only a single report is generated for all supergenres, so that the user does not need to select which supergenre to run the report on. Generally, an administrator triggers this task while managing the supergenres and/or genres, and either a genre report or a supergenres report is generated. In a preferred embodiment, the steps in this task for generating a supergenres report are as follows:
1. A user selects an option to generate and view a report on all the supergenres, and system 100 verifies that the user has the appropriate administrative privileges to perform the report generation.
2. Preferably, the user is notified that the user will have to manually return or click back to the user's present location within the system 100 site.
3. The system then displays the report to the user, preferably in a printer-friendly HTML format.
4. The user may then choose to print the report.
5. The user clicks back in his/her browser to return to the report generation page.

Also in a preferred embodiment, the steps in this task for generating a genre report are as follows:
1. The user selects one of the supergenres.
2. The system displays a list of all the genres in the supergenre, and the user selects a particular genre to generate a report on.
3. The user specifies the relevant time period for the report by entering start and end dates (or accepting default dates), and system 100 verifies that any entered time periods are valid.
4. The user then executes a generate report command, and system 100 confirms that the user has appropriate privileges.
5. The system displays the report to the user, preferably in printer-friendly HTML format.
6. The user may then choose to print the report, e.g. using a browser menu.
7. The user may then also return, or click back, to the report generation page and continue navigating through the system 100 site.

View Genre with Artists and Stations

This task is carried out by a user to view a genre and all of the artists and stations that are associated to the genre. In a preferred embodiment, the steps in this task are as follows:
1. The user selects a supergenre.
2. A list of genres that are associated to the selected supergenre are displayed.
3. The user then selects a specific genre from the genre list, and a genre detail screen, including all artists and stations that are associated with the genre, is displayed to the user.

Enable/Disable Genre(s)

An administrator may update the status of genres by carrying out an enable/disable genre task. The user must preferably have administrative privileges to access and edit supergenres. In a preferred embodiment, the steps in this task are as follows:
1. A user chooses to view a list of supergenres in system 100.
2. The user selects a supergenre from the supergenre list and executes an edit command. System 100 confirms whether the user has supergenre editing permission.
3. All of the genres associated with the selected supergenre are displayed.
4. As desired, the user then selects or de-selects genres to enable or disable them respectively.
5. The user executes an update command to save the changes, and an updated list of genres is shown.

Note that if a supergenre is new and does not yet have any associated genres, the screen showing the associated genre list may be presented as an empty screen. In this case, new genres may be added to the supergenre by carrying out the create new genre task, described below.

Create a New Genre

This task is used by an administrator to create a new genre that will be associated with a super genre, by adding a new genre or copying an existing genre. In a preferred embodiment, where the user adds a new genre, the steps in this task are as follows:
1. A user chooses to view a list of supergenres in system 100.
2. The user selects a supergenre from the supergenre list and executes an edit command. System 100 then confirms whether the user has supergenre editing authority.
3. All of the genres associated with the selected supergenre are displayed.
4. The user then chooses an add new genre option.
5. The user is prompted to enter a name for the new genre and submits the new name.
6. System 100 verifies that the entered name is valid. In particular, in a preferred embodiment, the new genre name must be unique within system 100.

7. The user is then directed to a screen where the user selects artists and stations that are to be associated with the new genre (see the edit existing genre task described below).
8. When the entering of associated artists and stations is complete, an update command is executed by the user (again, see the edit existing genre task described below).

Also in a preferred embodiment, where the user copies an existing genre, the steps in this task are as follows:
1. A user chooses to view a list of supergenres in system 100.
2. The user selects a supergenre from the supergenre list and executes an edit command. System 100 then confirms whether the user has supergenre editing authority.
3. All of the genres associated with the selected supergenre are displayed.
4. The user then chooses an add new genre option.
5. The user then selects a copy existing genre option.
6. A list of genres in system 100 is shown to the user.
7. The user selects a genre from the genre list and executes a copy command.
8. The selected genre is copied and the user is directed to a screen that permits the user to associate artists and stations to the new genre.
9. The user edits the artists and stations that are to be associated with the new/copied genre (see the edit existing genre task described below).
10. When the editing of associated artists and stations is complete, an update command is executed by the user.

Edit an Existing Genre

A user, preferably both a music manager and an administrator, may select and edit an existing genre using this task. At the conclusion of this task, the changes made to the existing genre metadata and associations—name of the genre, associated artists, and/or associated stations—are saved. In a preferred embodiment, the steps in this task are as follows:
1. The user selects an existing genre.
2. If desired, the user modifies the name of the genre.
3. If desired, the user disassociates artists from the genre or the user searches for artists and then associates artists to the genre.
4. If desired, the user disassociates stations from the genre, or the user associates stations to the genre.
5. Once all modifications are complete, the user executes an update command to save the changes to the genre.

Create a New Supergenre

An administrator may create a new supergenre by carrying out this task. Again this task is preferably only carried out by those users having administrative authority. In a preferred embodiment, the steps in this task are as follows:
1. A user selects a list supergenre command option provided on an administration home screen.
2. A list of supergenres is displayed.
3. The user selects an add new supergenre option.
4. The user is prompted to enter the new supergenre name in a specified field.
5. The user enters the name, and system 100 verifies that the entered name is unique.
6. The user then executes a save command.
7. The user is returned to the administration home screen, and the supergenre list is updated with the new supergenre.
8. The user may then enable the new supergenre from the supergenre list.

Edit an Existing Supergenre

An administrator may edit an existing supergenre by carrying out this task. Once again, this task is preferably only carried out by those users having administrative authority. At the conclusion of the task, modifications made to the existing supergenre are saved. In a preferred embodiment, the steps in this task are as follows:
1. A user selects a list supergenre command option provided on an administration home screen.
2. A list of supergenres is displayed.
3. A user selects an existing supergenre from the supergenre list.
4. A screen showing the supergenre details is displayed to the user.
5. The user modifies the supergenre's name, and then executes an update command to save the changes.

Delete an Existing Supergenre

An administrator may delete an existing supergenre by carrying out this task. As with other supergenre-related tasks, this task is preferably only carried out by those users having administrative operational privileges. At the conclusion of the task, the selected supergenre is deleted from the system along with all associated genres and supergenre-to-genre mapping for that supergenre. In a preferred embodiment, the steps in this task are as follows:
1. A user selects a list supergenre command option provided on an administration home screen.
2. A list of supergenres is displayed.
3. A user selects an existing supergenre from the supergenre list.
4. The user chooses a delete option and the supergenre is thereby purged. Optionally, system 100 may require the user to "empty" the supergenre of all associated genres, i.e. by deleting those genres, before allowing the supergenre to be deleted.

Move a Genre between Supergenres

An administrator may move one or more genres between supergenres by carrying out this task. Once again this task is preferably only carried out by those users having administrative permission. At the conclusion of the task, the selected genre is newly associated to a supergenre and the previous association to another supergenre is removed. In a preferred embodiment, the steps in this task are as follows:
1. The user selects an existing genre that is to be moved to another supergenre. This step may be performed using the view genre with artists and stations task described above.
2. A screen showing the selected genre's details is displayed to the user.
3. The user may then edit the genre details, at the appropriate field, to change the currently associated supergenre to another supergenre.
4. The user then executes an update command to save the change to the supergenre. System 100 then verifies that the user has permission to modify the supergenre field for the genre. Note that, since the edit genre task is preferably open to non-administrative users such as music managers, the supergenre field on a genre details screen is preferably a permission based field.

Assign User Rights to a Genre

An administrator may assign user rights to a genre so that a user is given permission to view/edit the genre. In a preferred embodiment, the steps in this task are as follows:
1. An administrator chooses an option to view existing users.
2. The administrator may filter and/or sort the list of users by first name, last name, or username.

3. The administrator selects a particular user for editing.
4. The user's information is displayed to the administrator.
5. The administrator selects an option to add access for a genre.
6. System 100 displays a list of genres to the administrator.
7. The administrator may filter/sort the genre list if desired.
8. The administrator selects a genre and executes an add command.
9. System 100 then redisplays the updated user information for the particular user.

System 100 may also be adapted to allow an administrator to perform a similar task in which an administrator edits user privileges to unassign or remove user rights to a genre (if necessary). For this alternative, a remove genre access option may be provided when the user's information is displayed.

Assign User Rights to a Station

An administrator may assign user rights to a station so that a user is given permission to view/edit the station. In a preferred embodiment, the steps in this task are as follows:
1. An administrator chooses an option to view existing users.
2. The administrator may filter and/or sort the list of users by first name, last name, or username.
3. The administrator selects a particular user for editing.
4. The user's information is displayed to the administrator.
5. The administrator selects an option to add access for a station.
6. System 100 displays a list of stations to the administrator.
7. The administrator may filter/sort the station list if desired.
8. The administrator selects a station and executes an add command.
9. System 100 then redisplays the updated user information for the particular user.

Again, system 100 may also be adapted to allow an administrator to perform a similar task in which an administrator edits user privileges to unassign or remove user rights to a station (if necessary). For this alternative, a remove station access option may be provided when the user's information is displayed.

System Sitemap

Figure 12A:
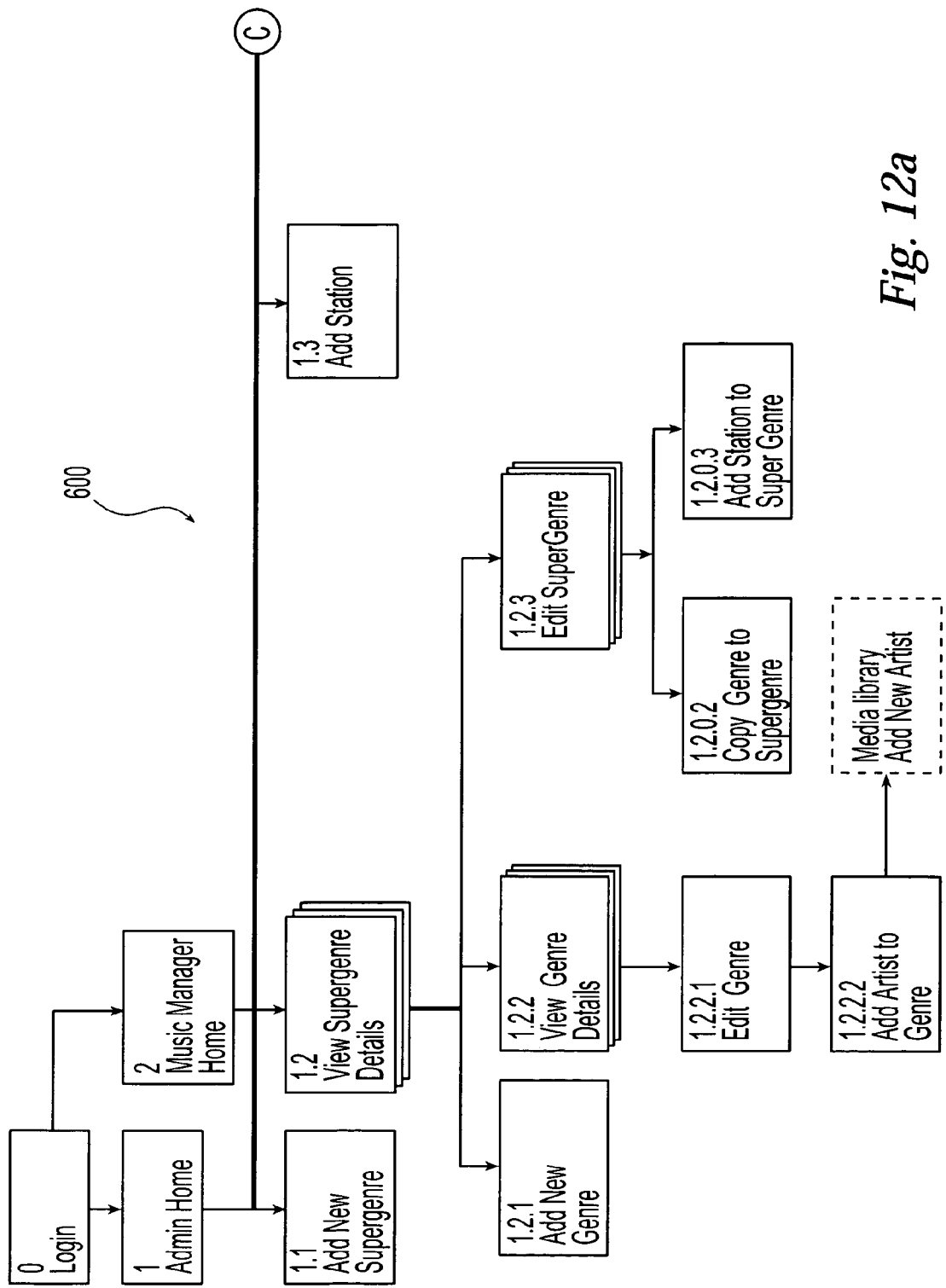
FIGS. 12A, 12B, and 12C illustrate a preferred embodiment of a site map for the system of FIG. 1.
Figure 12B:
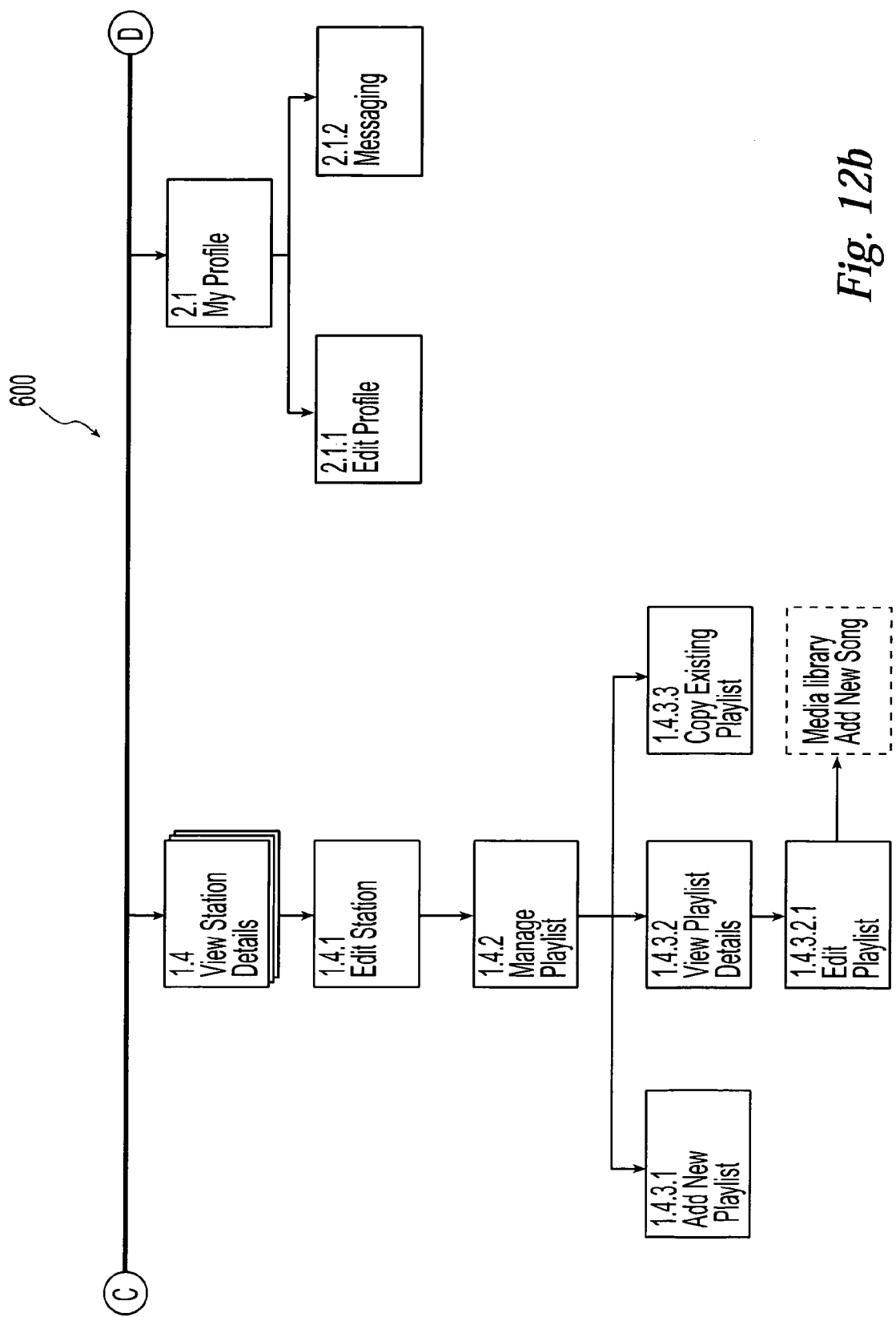
Figure 12C:
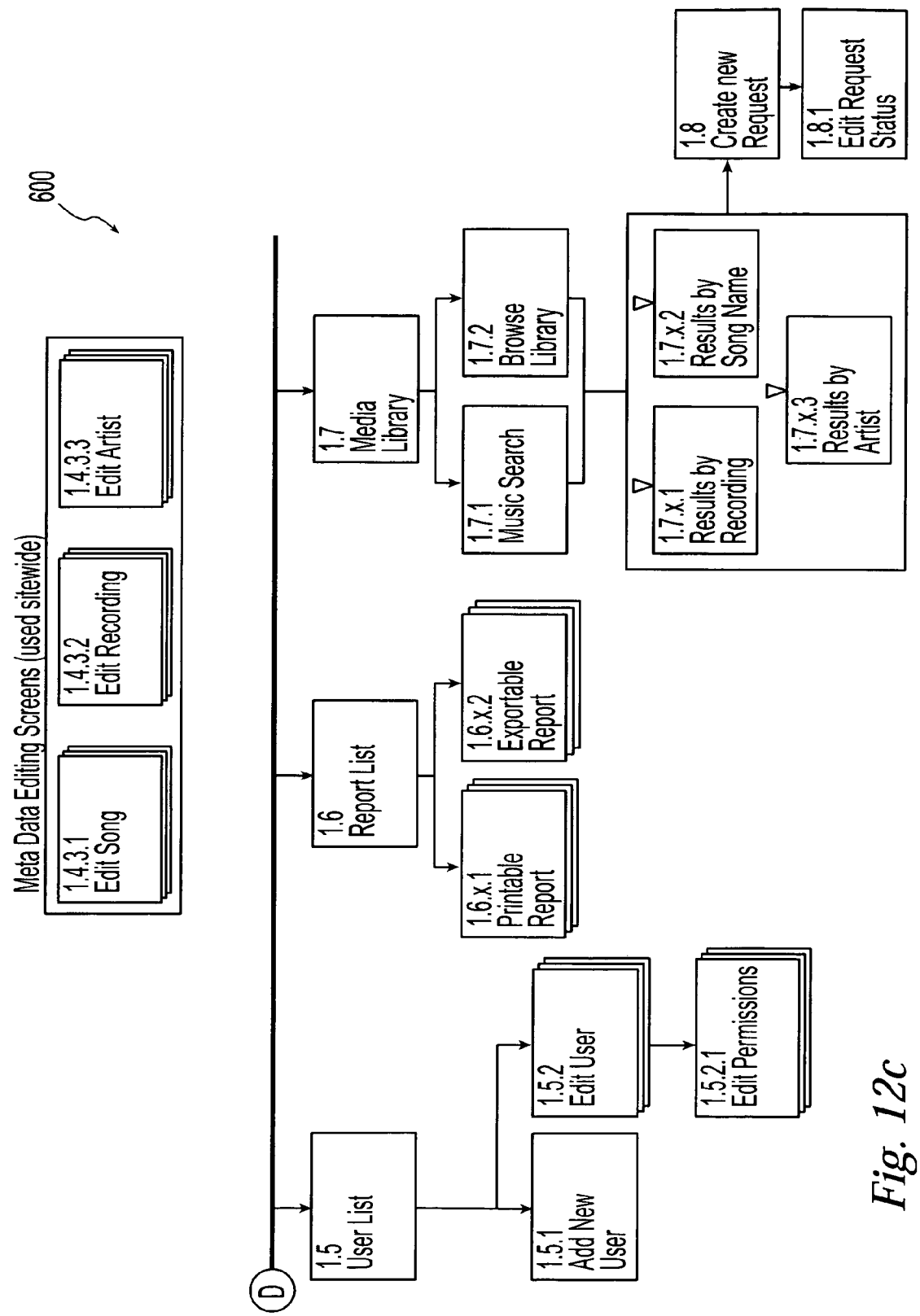

FIGS. 12A, 12B and 12C illustrate a preferred embodiment of a site map 600 for system 100 showing a map of system site screens or tools. As indicated above, system 100 may be accessed using a standard Web browser well known in the art. As illustrated, the site is entered at a login screen 0. Once logged in, the user is taken to an admin home screen 1 or a is music manager home screen 2, depending on the type of user. As described above, an administrator is generally able to navigate throughout the system site, while a music manager has a limited ability to do so (although these limitations on access vary depending on the operational privileges, if any, that have been assigned to the music manager). The system generally includes several site areas, the function and operation of each having been described in detail above.

A genre/supergenre area (shown in FIG. 12A) may be entered by an administrator through an add new supergenre screen 1.1 or through a view supergenre details screen 1.2. A manager may also enter this area through a view genre details screen 1.2.2. Only administrators may access an add new genre screen 1.2.1, an edit supergenre screen 1.2.3, a copy genre to supergenre screen 1.2.0.2, and an add station to supergenre screen 1.2.0.3. Generally, both types of users may access an edit genre screen 1.2.2.1 and an add artist to genre screen 1.2.2.2 (which may link to a media library—add new artist screen).

A station/playlist area (shown in FIG. 12A) may be entered by an administrator through an add station screen 1.3. Both administrators and music managers may access a view station details screen 1.4, an edit station screen 1.4.1, a manage playlist screen 1.4.2, an add new playlist screen 1.4.3.1, an view playlist screen 1.4.3.2, a copy existing playlist screen 1.4.3.3, and an edit playlist screen 1.4.3.2.1 (which may link to a media library—add new song screen).

A personal profile area (shown in FIG. 12B) may be accessed by both administrators and music managers via a my profile screen 2.1. Thereafter, users may access an edit profile screen 2.1.1, and a messaging screen 2.1.2. With the messaging tool, users are conveniently able to use chat or e-mail messaging functions to communicate with one another while logged on to system 100.

A user management area (shown in FIG. 12C) may be accessed only by administrators via a. user list screen 1.5. Only administrators may also access the add new user screen 1.5.1, an edit user screen 1.5.2, and an edit permissions screen 1.5.2.1. (In cases where a music manager also has user creation operational privileges, that manager may also have limited access to these user management screens for users created by that manager only.)

A reporting area (shown in FIG. 12C) may be accessed by both types of users via a report list screen 1.6, to both print reports at screen 1.6.x.1 and export reports at screen 1.6.x.2.

A media library and media request area (shown in FIG. 12C) may be accessed by both administrators and music managers through a media library screen 1.7. Users may then access either a music search area 1.7.1 or a browse library area 1.7.2, and in either case the results may be displayed by recording at a screen 1.7.x.1, by song name at a screen 1.7.x.2, or by artist at a screen 1.7.x.3. Administrators (and managers having appropriate permissions) may access a create new request screen 1.8. Similarly, administrators may access an edit request status screen 1.8.1.

In addition, as shown in FIG. 12C, an edit song metadata screen 1.4.3.1, and edit recording metadata screen 1.4.3.2, and an edit artist metadata screen 1.4.3.3 are accessible site-wide to administrators as well as to music managers who have been assigned appropriate operational permissions.

While the invention has been described in conjunction with specific embodiments, it is evident that numerous alternatives, modifications, and variations will be apparent to those skilled in the art in light of the foregoing description.

What is claimed is:

1. A system for managing the delivery of content over a network to a user comprising:
   a station and playlist module for managing the content delivered by one or more stations over the network, the type of content delivered by each of the stations being specified by a playlist for that station,
   wherein at least one of said stations includes two or more playlists and only one of said two or more playlists specifies the content delivered by that station at any one time,
   wherein the user adds content to at least one of the two or more playlists associated with the at least one station, and
   wherein the content is audio-based and each playlist includes a number of songs delivered by the station associated with that playlist; and
   a playlist validation module for verifying that a playlist contains at least one combination of songs that are in compliance with a set of licensing rules.

2. The system of claim 1 wherein the station and playlist module manages the content delivered by a plurality of stations.

3. The system of claim 1 wherein the network is the Internet.

4. The system of claim 1 wherein the content is multimedia-based and each playlist includes a number of music videos delivered by the station associated with that playlist.

5. The system of claim 1 wherein the system further comprises a promotions module for managing promotional content to be included in the playlists.

6. The system of claim 1 wherein the system further comprises an advertisement module for managing advertising content to be included in the playlists.

7. A method for managing the delivery of content over a network to a user comprising:

managing, by a station and playlist module, the content delivered by one or more stations over the network, the type of content delivered by each of the stations being specified by a playlist for that station, wherein at least one of said stations includes two or more playlists and only one of said two or more playlists specifies the content delivered by that station at any one time;

adding, by the user, content to at least one of the two or more playlists associated with the at least one station, wherein the content is audio-based and each playlist includes a number of songs delivered by the station associated with that playlist; and verifying, by a playlist validation module, that a playlist contains at least one combination of songs that are in compliance with a set of licensing rules.

* * * * *

UNITED STATES PATENT AND TRADEMARK OFFICE
CERTIFICATE OF CORRECTION

PATENT NO.         : 7,363,372 B2
APPLICATION NO.    : 09/777304
DATED              : April 22, 2008
INVENTOR(S)        : Casey S. Potenzone et al.

It is certified that error appears in the above-identified patent and that said Letters Patent is hereby corrected as shown below:

COLUMN 2

Line 39, "terns" should read --terms--.
Line 52, "only of" should read --only one of--.

COLUMN 3

Line 55, "nodule" should read --module--.

COLUMN 6

Line 19, "Gentre)" should read --Genre)--.

COLUMN 7

Line 4, "metadata" should read --metadata.--.

COLUMN 8

Line 44, "any" should read --or any--.

COLUMN 13

Line 45, "to" should be deleted.

COLUMN 14

Line 8, "list all" should read --list of all--.

COLUMN 16

Line 39, "nietadata," should read --metadata--.

COLUMN 21

Line 61, "problem" should read --problem.--.

COLUMN 23

Line 15, "farther" should read --further--.

UNITED STATES PATENT AND TRADEMARK OFFICE
CERTIFICATE OF CORRECTION

PATENT NO. : 7,363,372 B2
APPLICATION NO. : 09/777304
DATED : April 22, 2008
INVENTOR(S) : Casey S. Potenzone et al.

It is certified that error appears in the above-identified patent and that said Letters Patent is hereby corrected as shown below:

COLUMN 24

Line 23, "this not" should read --this is not--.
    Line 37, "screen" should read --screen.--.

COLUMN 25

Line 28, "request" should read --request.--.

COLUMN 29

Line 48, "a is music" should read --a music--.

COLUMN 30

Line 17, "a.user" should read --a user--.

COLUMN 31

Line 1, "claim 1" should read --claim 1,--.
    Line 4, "claim 1" should read --claim 1,--.
    Line 6, "claim 1" should read --claim 1,--.
    Line 9, "claim 1" should read --claim 1,--.
    Line 12, "claim 1" should read --claim 1,--.

Signed and Sealed this

Twenty-sixth Day of August, 2008

JON W. DUDAS
*Director of the United States Patent and Trademark Office*